(12) United States Patent
Hyde et al.

(10) Patent No.: US 8,600,298 B1
(45) Date of Patent: *Dec. 3, 2013

(54) INTERFERENCE REJECTION IN RFID TAGS

(71) Applicant: Impinj, Inc., Seattle, WA (US)

(72) Inventors: John D. Hyde, Corvallis, OR (US); Kurt E. Sundstrom, Woodinville, WA (US)

(73) Assignee: Impinj, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/666,285

(22) Filed: Nov. 1, 2012

Related U.S. Application Data

(63) Continuation of application No. 12/749,648, filed on Mar. 30, 2010, now Pat. No. 8,391,785.

(51) Int. Cl.
*H04B 5/00* (2006.01)

(52) U.S. Cl.
USPC .................................... 455/41.1; 455/67.13

(58) Field of Classification Search
USPC ......... 455/39, 41.1, 41.2, 41.3, 42, 43, 67.13; 340/10.1, 10.52, 10.34, 572.1
See application file for complete search history.

(56) References Cited

U.S. PATENT DOCUMENTS

| | | | | |
|---|---|---|---|---|
| 4,070,631 | A * | 1/1978 | Nash et al. | 327/291 |
| 6,294,953 | B1 * | 9/2001 | Steeves | 329/341 |
| 2005/0052279 | A1 * | 3/2005 | Bridgelall | 340/10.1 |

* cited by examiner

*Primary Examiner* — Ping Hsieh
(74) *Attorney, Agent, or Firm* — Turk IP Law, LLC

(57) ABSTRACT

RFID tags, tag circuits, and methods are provided that reject at least in part the distortion caused to wireless signals by interference in the environment. When the received RF wave is converted into an unfiltered input (971), a filtered output (972) is generated that does not include an artifact feature deriving from the distortion. The filtered output is used instead of the unfiltered input, which results in tag operation as if there were less interference in the environment, or none at all.

21 Claims, 28 Drawing Sheets

*RFID SYSTEM*

*RFID SYSTEM*

*RFID TAG*

WITH SINGLE FILTERING PORTION

WITH MULTIPLE FILTERING PORTIONS

*ADJUSTING THE LOW THRESHOLD*

*ADJUSTING THE PASS RANGE*

*CONSIDERING PACKETS*

*BEGINNING WAVEFORM OF TRANSMITTED SIGNAL*

*FILTER ADJUSTMENT BASED ON NEXT EXPECTED SIGNAL*

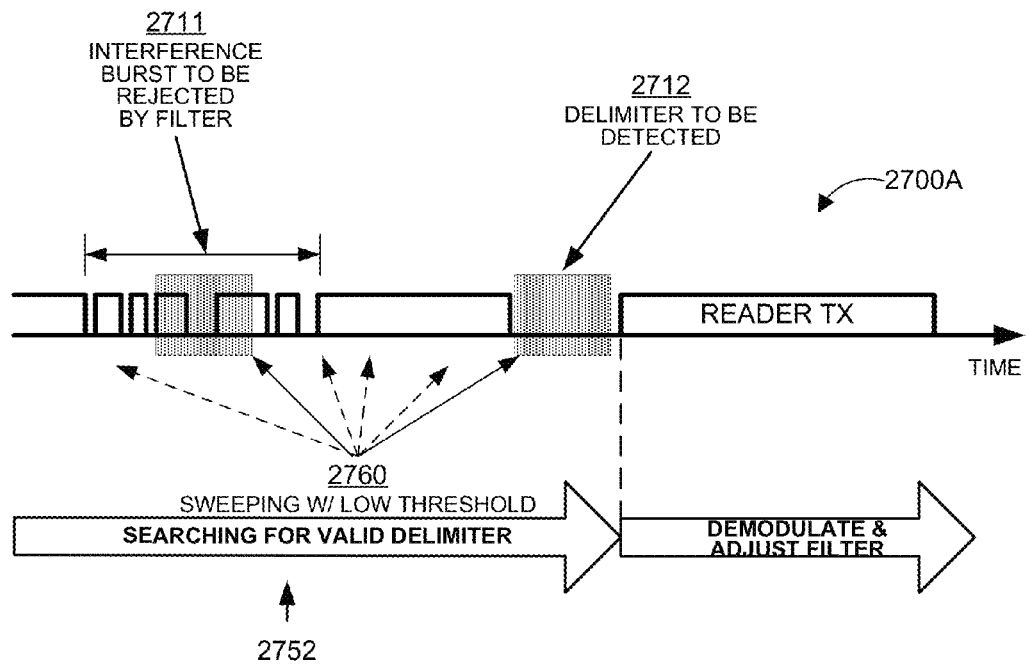
FIGURE 27A  *RECEIVED WAVEFORM BEING FILTERED*
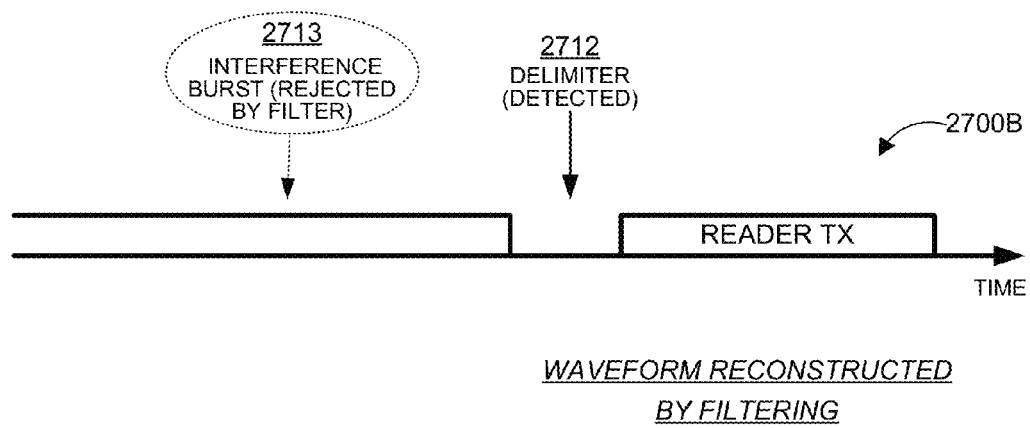
FIGURE 27B  *WAVEFORM RECONSTRUCTED BY FILTERING*

IMPROVEMENT DUE TO
EMBODIMENTS

INTERFERENCE REJECTION IN RFID TAGS

RELATED APPLICATIONS

This application is a continuation of co-pending U.S. patent application Ser. No. 12/749,648 filed on Mar. 30, 2010 by the same inventors, commonly assigned herewith

TECHNICAL FIELD

The present invention relates to Radio Frequency IDentification (RFID) systems; and more particularly, to an interference rejection filtering circuit and methods for RFID tags.

BACKGROUND

Radio Frequency IDentification (RFID) systems typically include RFID tags and RFID readers (the former are also known as labels or inlays, and the latter are also known as RFID reader/writers or RFID interrogators). RFID systems can be used in many ways for locating and identifying objects to which the tags are attached. RFID systems are particularly useful in product-related and service-related industries for tracking large numbers of objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. A tag that senses the interrogating RF wave responds by transmitting back another RF wave. The tag generates the transmitted-back RF wave either originally, or by reflecting back a portion of the interrogating RF wave, in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a power management section, a radio section, and frequently a logical section, a memory, or both. In earlier RFID tags, the power management section included a energy storage device, such as a battery. RFID tags with a energy storage device are known as active tags. Advances in semiconductor technology have miniaturized the electronics so much that an RFID tag can be powered solely by the RF signal it receives. Such RFID tags do not include a energy storage device, and are called passive tags.

A problem can be if the RF wave received by the tag includes distortion due to interference. Interference can arise from a variety of intentional and unintentional transmission sources in the vicinity. Interfering RF signals may be generated, for example, from nearby wireless devices such as other RFID readers, and also cellular telephones, personal digital assistants, and the like.

When the tag circuit converts the received RF wave into a received signal, that signal is also distorted due to the interference. The distorted signal may cause false bits to be detected by the RFID tag, which in turn can result in the RFID tag not being able to detect the interrogating RF wave reliably, or parse its commands.

SUMMARY

The invention helps overcome the problems in the prior art. RFID tags, circuits and methods are provided that reject at least in part the distortion caused to wireless signals by interference in the environment.

In some embodiments, when the received RF wave is converted into an unfiltered input, a filtered output is generated that does not include an artifact feature deriving from the distortion. The filtered output is used instead of the unfiltered input, which results in tag operation as if there were less interference in the environment, or none at all.

Other features and advantages of the invention will be understood from the Detailed Description, and the Brief Description of the Drawings, in which:

BRIEF DESCRIPTION OF THE DRAWINGS

Non-limiting and non-exhaustive embodiments are described with reference to the following drawings.

FIG. 27A is a diagram illustrating a sample waveform received during a portion of the signaling of FIG. 26, distorted by a burst of interference, and as it is further swept by a filter of the tag in attempting to reject the interference while attempting to detect a preamble;

FIG. 27B is a diagram illustrating how the received waveform of FIG. 27A is reconstructed as a result of the filter, thus rejecting artifact features deriving from the interference and enabling detection of the delimiter.

DETAILED DESCRIPTION

Figure 1:
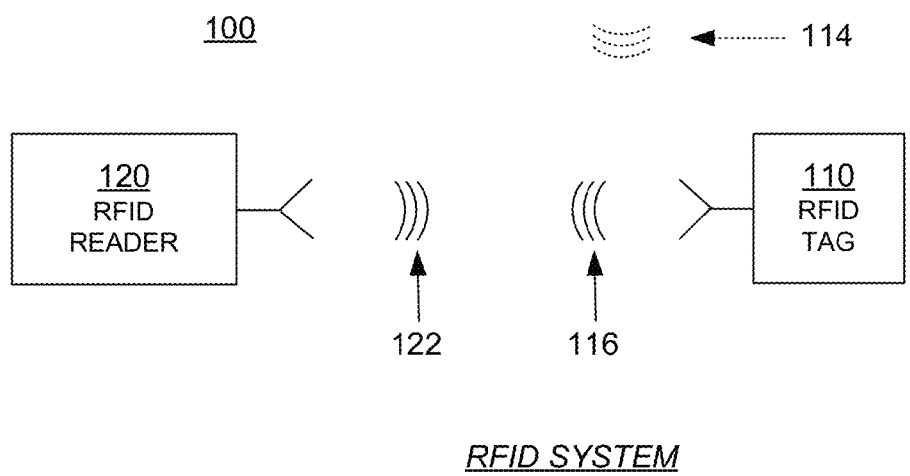
FIG. 1 is a diagram of an example RFID system including an RFID reader communicating with an RFID tag in its field of view and an interfering signal.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other measurable quantity. The terms "RFID reader" and "RFID tag" are used interchangeably with the terms "reader" and "tag", respectively, throughout the text and claims.

All of the circuits described in this document may be implemented as circuits in the traditional sense, such as with integrated circuits etc. All or some of them can also be implemented equivalently by other ways known in the art, such as by using one or more processors, Digital Signal Processing (DSP), a Floating Point Gate Array (FPGA), etc.

Briefly, this disclosure is about filtering a received signal in RFID tags to reject the effects of interference, and related features. The invention is now described in more detail.

FIG. 1 is a diagram of a typical RFID system 100, incorporating aspects of the invention. An RFID reader 120 transmits an interrogating Radio Frequency (RF) wave 122. RFID tag 110 in the vicinity of RFID reader 120 may sense interrogating RF wave 122, and generate wave 116 in response. RFID reader 120 senses and interprets wave 116.

Reader 120 and tag 110 exchange data via wave 122 and wave 116. In a session of such an exchange, each encodes, modulates, and transmits data to the other, and each receives, demodulates, and decodes data from the other. The data is modulated onto, and decoded from, RF waveforms, as will be seen in more detail below.

Encoding the data can be performed in a number of different ways. For example, protocols are devised to communicate in terms of symbols, also called RFID symbols. A symbol for communicating can be a preamble, a null symbol, and so on. Further symbols can be implemented for exchanging binary data, such as "0" and "1".

In the vicinity there may also be interference, shown here in the form of RF wave 114 from another other source (not shown). RF wave 114 arrives at tag 110 at the same time as intended interrogating signal 122. RF signals 122, 116, and 114 are shown as discontinuous to denote their possibly different treatment, but that is only for illustration. They may, in fact, be part of the same continuous signal. While RF wave 114 might not have the same carrier frequency as interrogating signal 122, it might have a close enough carrier frequency that generates a beat frequency with it. The beat frequency in turn interferes with reception, as will be seen below.

Tag 110 can be a passive tag or an active tag, i.e. having its own power source. Where tag 110 is a passive tag, it is powered from wave 122.

Figure 2:
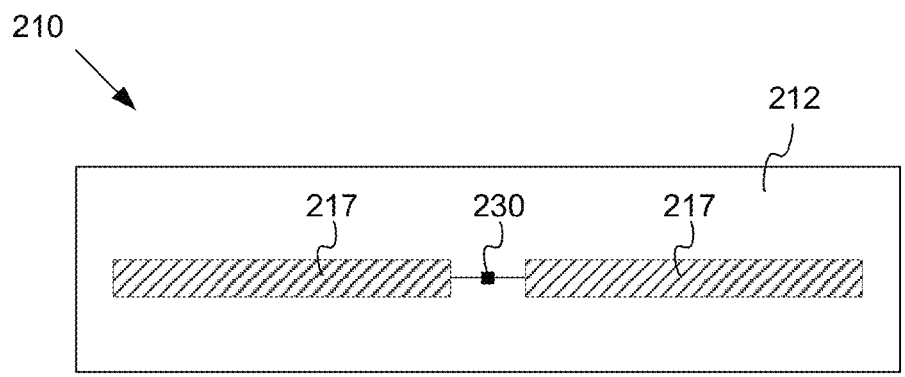
FIG. 2 is a diagram of an RFID tag such the tag of FIG. 1.

FIG. 2 is a diagram of an RFID tag 210. Tag 210 is implemented as a passive tag, meaning it does not have its own power source. Much of what is described in this document, however, applies also to active tags.

Tag 210 is formed on a substantially planar inlay 212, which can be made in many ways known in the art. Tag 210 also includes two antenna segments 217, which are usually flat and attached to inlay 212. Antenna segments 217 are shown here forming a dipole, but many other embodiments using any number of antenna segments are possible.

Tag 210 also includes an electrical circuit, which is also known as a tag circuit, and is preferably implemented in an integrated circuit (IC) 230. IC 230 is also arranged on inlay 212, and electrically coupled to antenna segments 217. Only one method of coupling is shown, while many are possible.

In operation, a signal is received by antenna segments 217, and communicated to IC 230. IC 230 both harvests power, and decides how to reply, if at all. If it has decided to reply, IC 230 modulates the reflectance of antenna segments 217, which generates the backscatter from a wave transmitted by the reader. Coupling together and uncoupling antenna segments 217 can modulate the reflectance, as can a variety of other means.

In the embodiment of FIG. 2, antenna segments 217 are separate from IC 230. In other embodiments, antenna segments may alternately be formed on IC 230, and so on.

Figure 3:
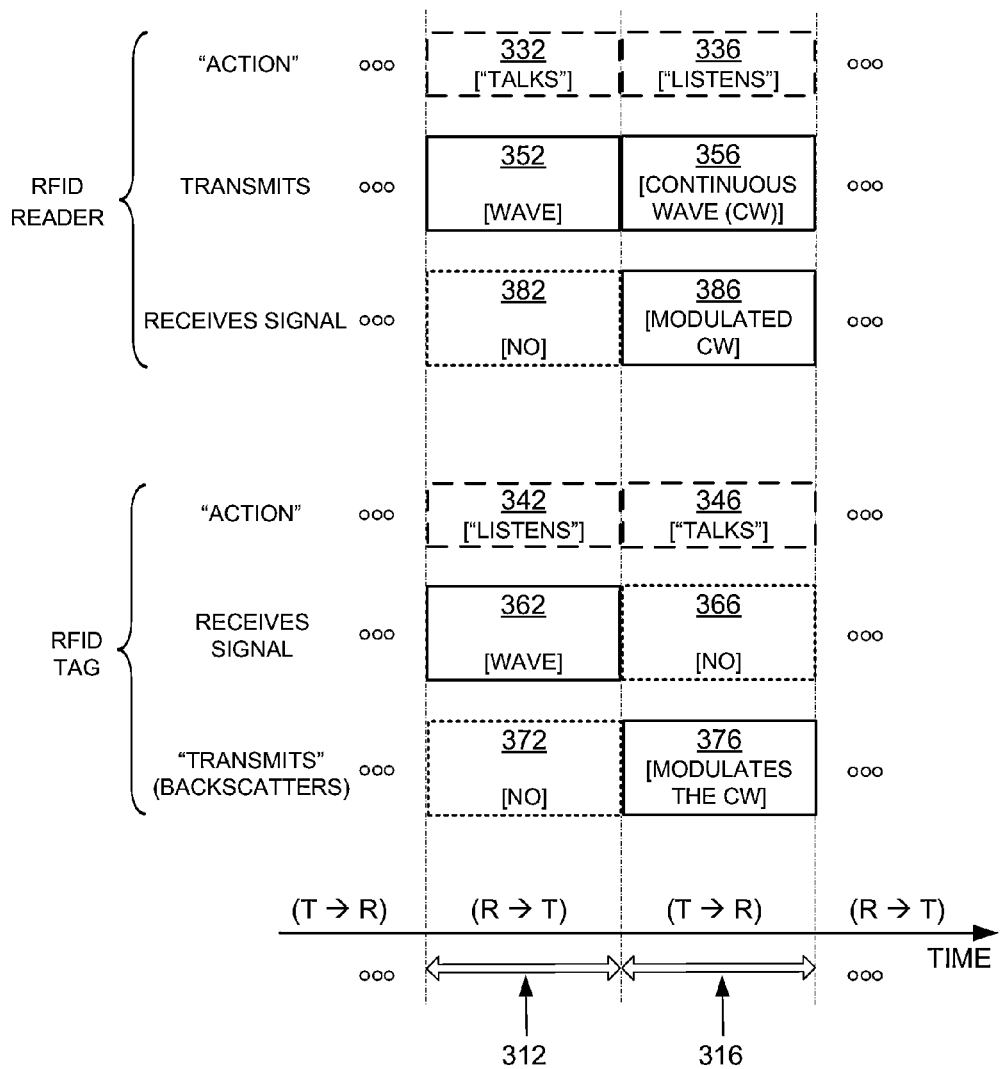
FIG. 3 is a conceptual diagram for explaining a half-duplex mode of communication between the components of the RFID system of FIG. 1.

FIG. 3 is a conceptual diagram for explaining the half-duplex mode of communication between the components of the RFID system of FIG. 1, during operation.

The explanation is made with reference to a TIME axis, and also to a human metaphor of "talking" and "listening". The actual technical implementations for "talking" and "listening" are now described.

RFID reader 120 and RFID tag 110 talk and listen to each other by taking turns. As seen on axis TIME, when reader 120 talks to tag 110 the session is designated as "R→T", and when tag 110 talks to reader 120 the communication session is designated as "T→R". Along the TIME axis, a sample R→T communication session occurs during a time interval 312, and a following sample T→R communication session occurs during a time interval 316. Of course intervals 312, 316 can be of different durations—here the durations are shown approximately equal only for purposes of illustration.

According to blocks 332 and 336, RFID reader 120 talks during interval 312, and listens during interval 316. According to blocks 342 and 346, RFID tag 110 listens while reader 120 talks (during interval 312), and talks while reader 120 listens (during interval 316).

In terms of actual technical behavior, during interval 312, reader 120 talks to tag 110 as follows. According to block 352, reader 120 transmits wave 122, which was first described in FIG. 1. At the same time, according to block 362, tag 110 receives wave 122 and processes it. Meanwhile, according to block 372, tag 110 does not backscatter with its antenna, and according to block 382, reader 120 has no wave to receive from tag 110.

During interval 316, tag 110 talks to reader 120 as follows. According to block 356, reader 120 transmits a Continuous Wave (CW), which can be thought of as a carrier signal that ideally encodes no information. As discussed before, this carrier signal serves both to be harvested by tag 110 for its own internal power needs, and also as a wave that tag 110 can backscatter. Indeed, during interval 316, according to block 366, tag 110 does not receive a signal for processing. Instead, according to block 376, tag 110 modulates the CW emitted according to block 356, so as to generate backscatter wave 112. Concurrently, according to block 386, reader 120 receives backscatter wave 112 and processes it.

Figure 4:
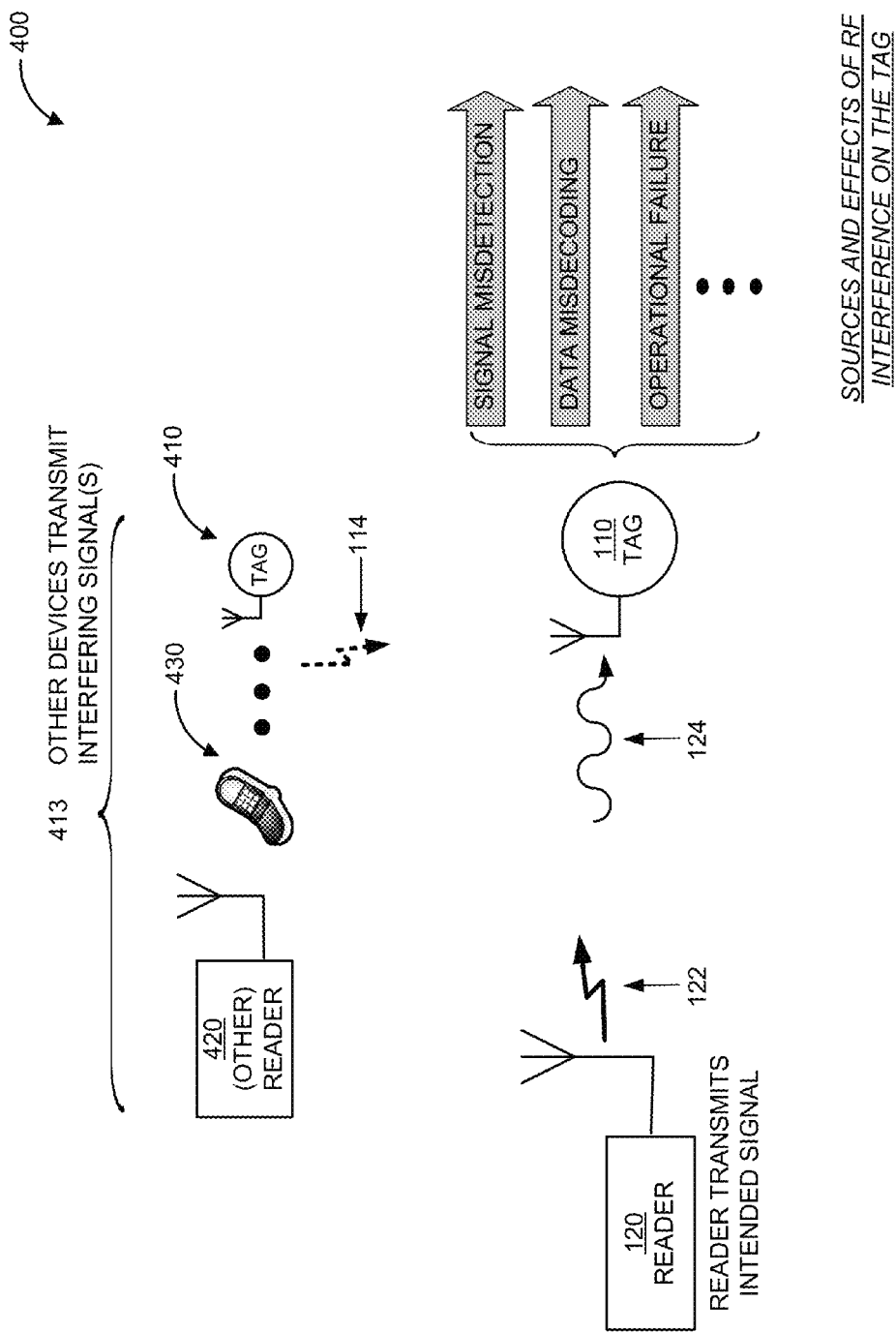
FIG. 4 is a conceptual diagram for explaining sources and effects of RF interference on the RFID tag for the system of FIG. 1.

FIG. 4 is a conceptual diagram for explaining sources and effects of RF interference on the RFID tag for the system of FIG. 1.

As shown in the figure, reader 120 transmits an intended signal in form of RF wave 122. Wave 122 travels through a medium, usually air, and in an ideal operation, wave 122 would arrive at tag 110 without any distortion from interference. Then it would be received and processed by tag 110.

In the real world, however, there are interference sources in the environment that wave 122 travels in. Wave 114 illustrated represents interfering signal(s) that can distort wave 122 as it travels. Wave 114 may be transmitted intentionally or unintentionally by a number of sources such as other reader 420, cellular phone 430, tag 410, and the like. These sources may be grouped as other devices 413 that transmit the interfering signal(s).

Accordingly, as wave 122 travels through the medium, it is affected by wave 114, and arrives at tag 110 as wave 124. Wave 124 may be modified in more than one way from wave 122. For example, its amplitude may be distorted, extra frequency components may be added, and even its phase may be distorted.

Since distorted wave 124 is received instead of wave 122 a number of undesirable effects may result for the tag. Such effects may include signal misdetection, data misdecoding, operational failure, and the like.

Figure 5:
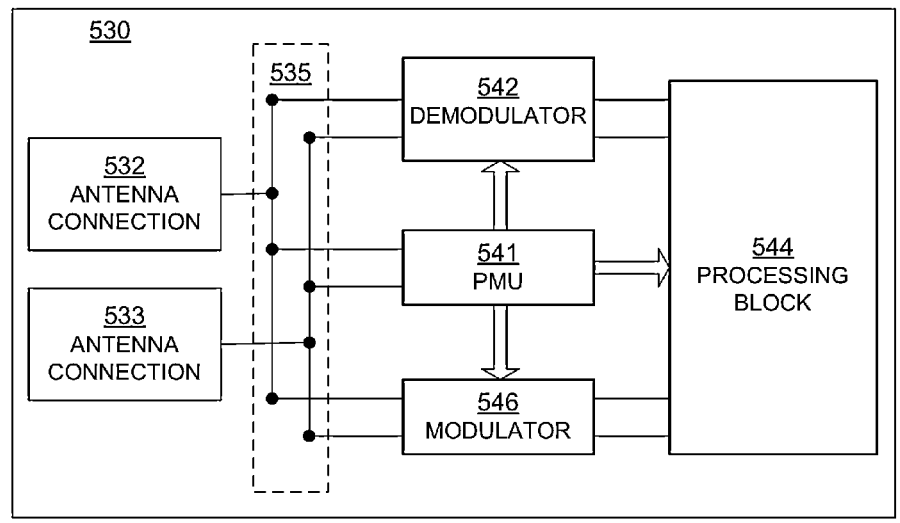
FIG. 5 is a block diagram illustrating one embodiment of an electrical circuit that may be employed in an RFID tag such as the RFID tag of FIG. 1.

FIG. 5 illustrates an embodiment of a block diagram for electrical circuit 530 that may be employed in an RFID tag such as the RFID tag of FIG. 2.

Circuit 530 has a number of main components that are described in this document. Circuit 530 may have a number of additional components from what is shown and described, or different components, depending on the exact implementation.

Circuit 530 includes at least two antenna connections 532, 533, which are suitable for coupling to one or more antenna segments (not shown in FIG. 5). Antenna connections 532, 533 may be made in any suitable way, such as pads and so on. In a number of embodiments more antenna connections are used, especially in embodiments where more antenna segments are used.

Circuit 530 includes a section 535. Section 535 may be implemented as shown, for example as a group of nodes for proper routing of signals. In some embodiments, section 535 may be implemented otherwise, for example to include a receive/transmit switch that can route a signal, and so on.

Circuit 530 also includes a Power Management Unit (PMU) 541. PMU 541 may be implemented in any way known in the art, for harvesting raw RF power received via antenna connections 532, 533. In some embodiments, PMU 541 includes at least one rectifier, and so on.

In operation, an RF wave received via antenna connections 532, 533 is received by PMU 541, which in turn generates power for components of circuit 530. This is true for either or both of R→T sessions (when the received RF wave carries a signal) and T→R sessions (when the received RF wave carries no signal).

Circuit 530 additionally includes a demodulator 542. Demodulator 542 demodulates an RF signal received via antenna connections 532, 533. Demodulator 542 may be implemented in any way known in the art, for example including an attenuator stage, amplifier stage, and so on.

Circuit 530 further includes a processing block 544. Processing block 544 receives the demodulated signal from demodulator 542, and may perform operations. In addition, it may generate an output signal for transmission.

Processing block 544 may be implemented in any way known in the art. For example, processing block 544 may include a number of components, such as a processor, a memory, a decoder, an encoder, and so on.

Circuit 530 additionally includes a modulator 546. Modulator 546 modulates an output signal generated by processing block 544. The modulated signal is transmitted by driving antenna connections 532, 533, and therefore driving the load presented by the coupled antenna segment or segments. Modulator 546 may be implemented in any way known in the art, for example including a driver stage, amplifier stage, and so on.

In one embodiment, demodulator 542 and modulator 546 may be combined in a single transceiver circuit. In another embodiment, modulator 546 may include a backscatter transmitter or an active transmitter.

It will be recognized at this juncture that circuit 530 can also be the circuit of an RFID reader according to the invention, without needing PMU 541. Indeed, an RFID reader can typically be powered differently, such as from a wall outlet, a battery, and so on. Additionally, when circuit 530 is configured as a reader, processing block 544 may have additional Inputs/Outputs (I/O) to a terminal, network, or other such devices or connections.

In terms of processing a signal, circuit 530 operates differently during a R→T session and a T→R session. The treatment of a signal is described below.

Figure 6A:
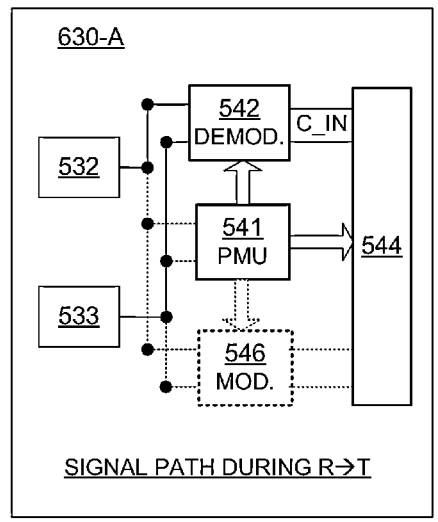
FIGS. 6A and 6B illustrate two versions of the electrical circuit of FIG. 5, further emphasizing signal flow in receive and transmit operational modes of the RFID tag, respectively.
Figure 6B:
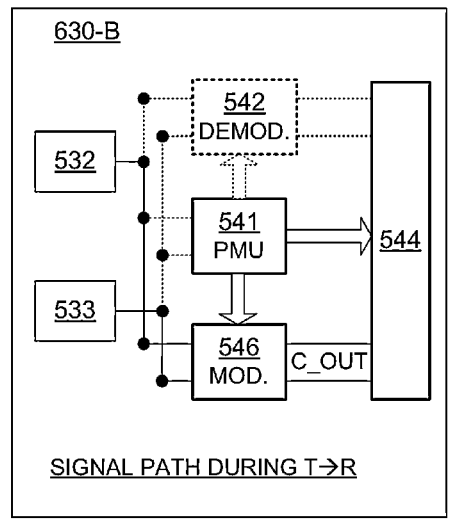

FIGS. 6A and 6B illustrate two versions of the electrical circuit of FIG. 5 emphasizing signal flow in receive and transmit operational modes, respectively.

Version 630-A shows the components of circuit 530 for a tag, further modified to emphasize a signal operation during a R→T session (receive mode of operation) during time interval 312 of FIG. 3. An RF wave is received from antenna connections 532, 533, a signal is demodulated from demodulator 542, and then input to processing block 544 as C_IN. In one embodiment according to the present invention, C_IN may include a received stream of symbols. It is during this operation that the indirect instruction may be received from the reader as to what backscatter period to use.

Version 630-A shows as relatively obscured those components that do not play a part in processing a signal during a R→T session. Indeed, PMU 541 may be active, and may be converting raw RF power. And modulator 546 generally does not transmit during a R→T session, by modulating.

While modulator 546 is typically inactive during a R→T session, it need not be always the case. For example, during a R→T session, modulator 546 could be active in other ways. For example, it could be adjusting its own parameters for operation in a future session.

Version 630-B shows the components of circuit 530 for a tag, further modified to emphasize a signal operation during a T→R session during time interval 316 of FIG. 3. A signal is output from processing block 544 as C_OUT. In one embodiment according to the present invention, C_OUT may include a transmission stream of symbols. C_OUT is then modulated by modulator 546, and output as an RF wave via antenna connections 532, 533.

Version 630-B shows as relatively obscured those components that do not play a part in processing a signal during a T→R session. Indeed, PMU 541 may be active, and may be converting raw RF power. And demodulator 542 generally does not receive during a T→R session. Demodulator 542 typically does not interact with the transmitted RF wave, either because switching action in section 535 decouples the demodulator 542 from the RF wave, or by designing demodulator 542 to have a suitable impedance, and so on.

While demodulator 542 is typically inactive during a T→R session, it need not be always the case. For example, during a T→R session, demodulator 542 could be active in other ways. For example, it could be adjusting its own parameters for operation in a future session.

Figure 7:
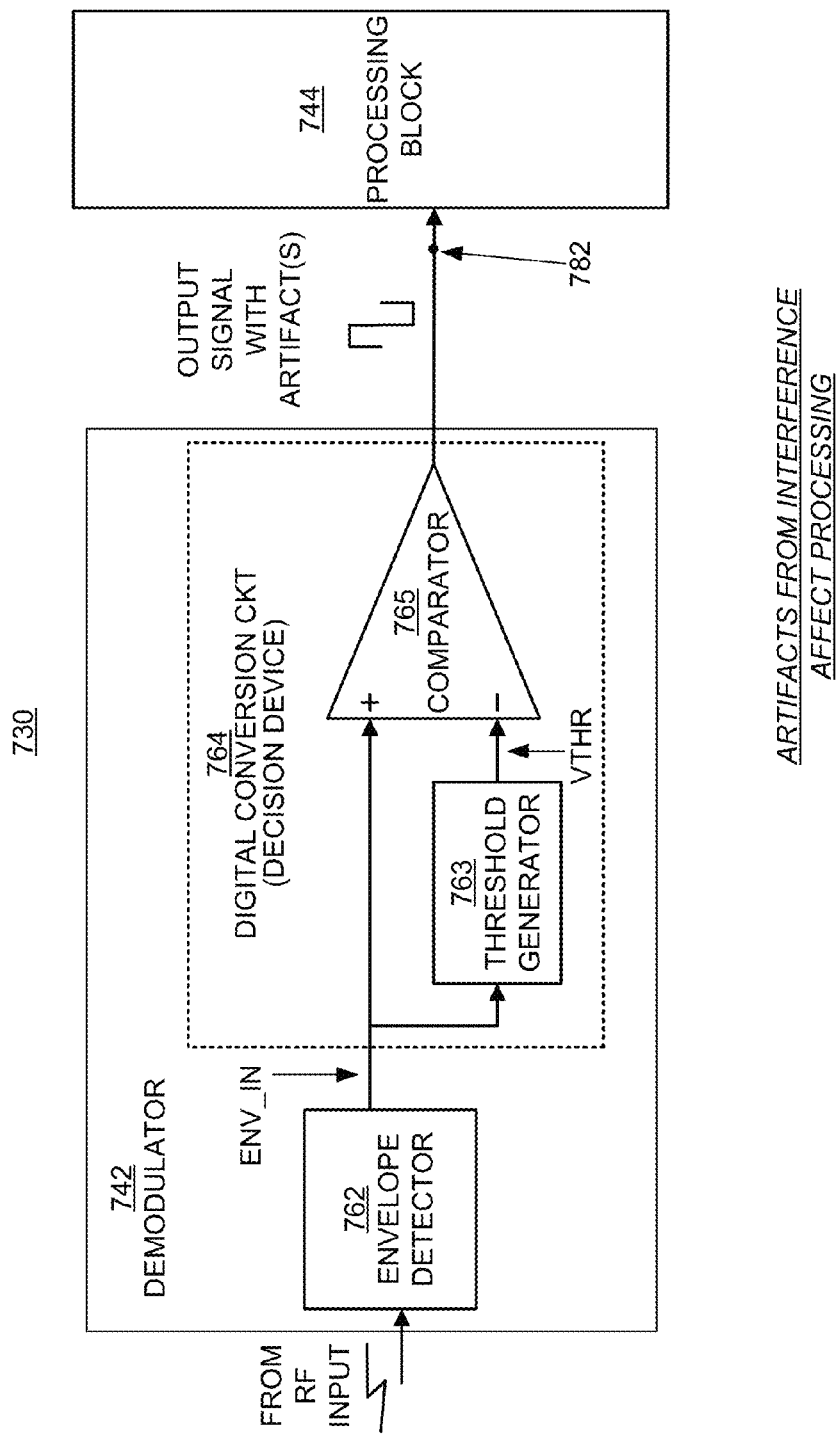
FIG. 7 is a block diagram showing functional blocks of a demodulator circuit, such as the demodulator circuit of the RFID tag of FIG. 5, for explaining how interference affects adversely operation of the tag.

FIG. 7 is a partial block diagram of a tag circuit 730. Circuit 730 shows functional blocks of a demodulator circuit, such as the demodulator circuit of the RFID tag of FIG. 5, for explaining how interference affects adversely operation of the tag. A processor 744 is shown, which can be made the same way as processor 544. In addition, a demodulator 742 is shown, which can be made in any number of ways, for example in the same way as demodulator 542.

Demodulator 742 is arranged to receive a wireless RF input signal from an RFID reader, and convert it to a digital output signal at a node 782. The signal at node 782 is also known as the received first signal, and is ultimately derived from the wireless RF input signal, which can include distortion due to interference.

Furthermore, processor 744 receives the signal from node 782, and uses it to decode commands, data, and the like, perform actions associated with the decoded commands, and respond to the reader.

It is apparent from FIG. 7 that any distortion in the RF input due to interference gives rise to an artifact feature at the digital output signal at a node 782. The artifact feature is a feature that did not arise properly, and yet is received and interpreted by processor 744. As such, it can cause processor 744 to not respond exactly as intended.

Demodulator 742 can be made in any number of ways. One such way is now described, along with the manner in which artifact features in node 782 arise due to interference in the RF input.

Demodulator 742 includes an envelope detector 762, followed by a digital conversion circuit 764. Envelope detector 762 is configured to convert modulated RF input to an analog baseband signal ENV_IN, which corresponds to an envelope of the received wireless signal. Envelope detector 762 is well known in the art, and may include an envelope detector core and a low pass filter. The envelope detector core may include a diode detector in its simplest form, but is not limited to a diode detector. The circuit is arranged to detect an envelope of the RF input signal, and generate a low frequency (baseband) signal based on the signal envelope.

Digital conversion circuit 764 converts the analog baseband signal, ENV_IN to a digital output signal at node 782. Digital conversion circuit 764 may also be known as a decision device 764 or as slicer 764, and may be implemented in any number of ways. In the embodiment of FIG. 7, digital conversion circuit 764 employs a comparator 765 and a threshold generator 763. Typically, threshold generator 763 provides a threshold signal, VTHR (e.g. a DC (direct current) or slowly varying signal) to comparator 765. Another input of comparator 765 is arranged to receive the analog baseband signal, ENV_IN. Comparator 765 then provides a digital logic signal at node 782, which is based on a result of the comparison between the analog baseband signal and the threshold signal provided by threshold generator 763.

Figure 8A:
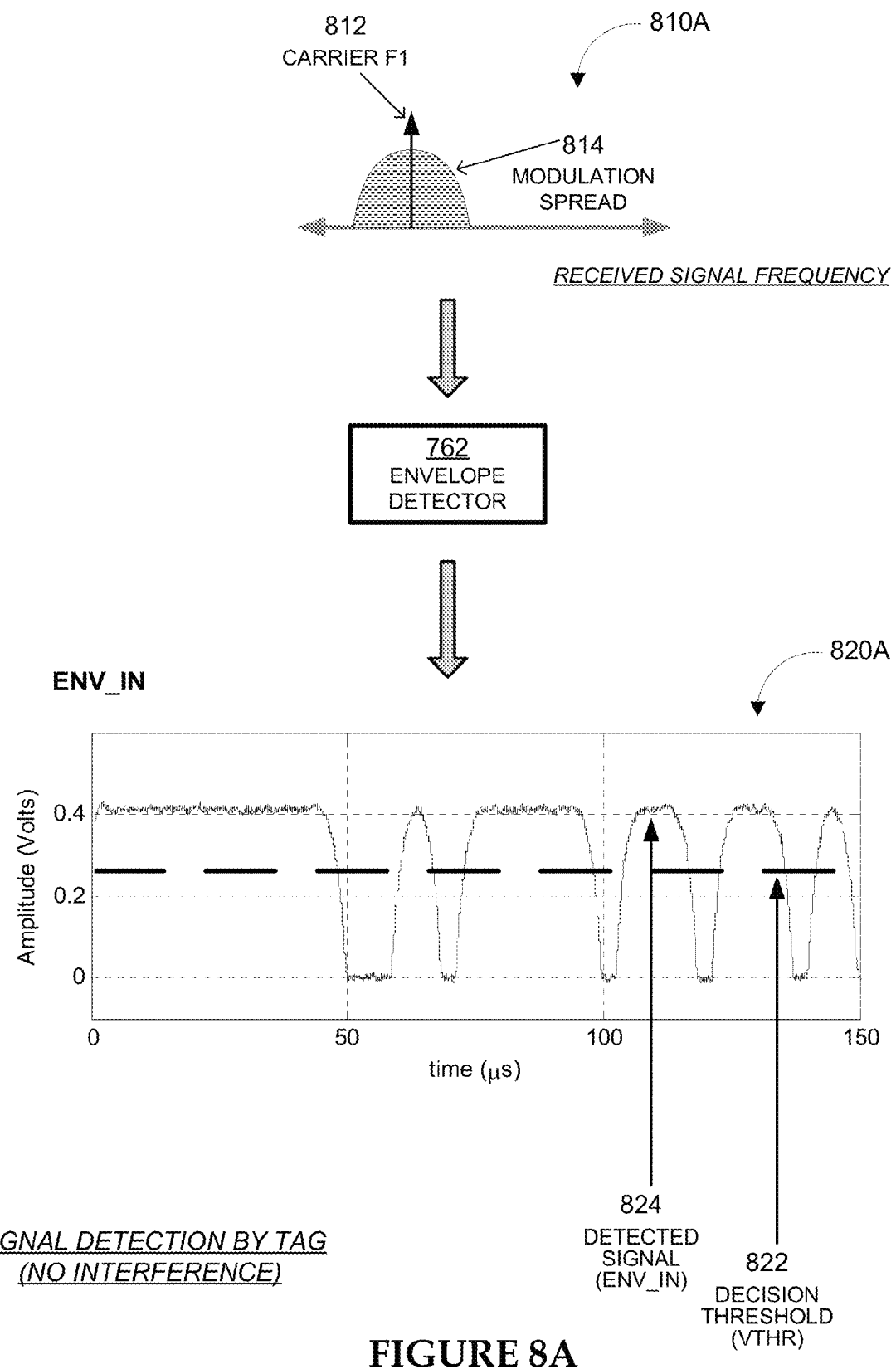
FIG. 8A is presented for explaining signal detection by an RFID tag in the absence of interference.

FIG. 8A is a presented for explaining signal detection by an RFID tag, in the theoretical case of absence of interference.

A diagram 810A shows a sample frequency distribution of the wireless reader wave, as it is received in the absence of interference. The wave is centered around a carrier Frequency F1 812. The wave is also modulated, which gives rise to a modulation spread 814 around F1 812. Spread 814 can be continuous as shown, or discontinuous, and so on.

The received signal of diagram 810A is detected by the above described envelope detector 762. The resulting baseband signal ENV_IN (824) shown in another diagram 820A with amplitude and time axes.

Diagram 820A also shows decision threshold 822 (VTHR) of comparator 765. Decision threshold 822 partitions the detected baseband signal into decision values (e.g. "0" and "1", or "High" and "Low"), any time the baseband signal ENV_IN drops crosses threshold 822. In turn, these decision values can give rise to bits and data, depending on the system.

In the ideal case without interference, valid signal transitions are clearly detectable in diagram 820A. Accordingly, decision threshold 822 may be set to provide adequate margin (Euclidean distance) from the signal minima and maxima.

Figure 8B:
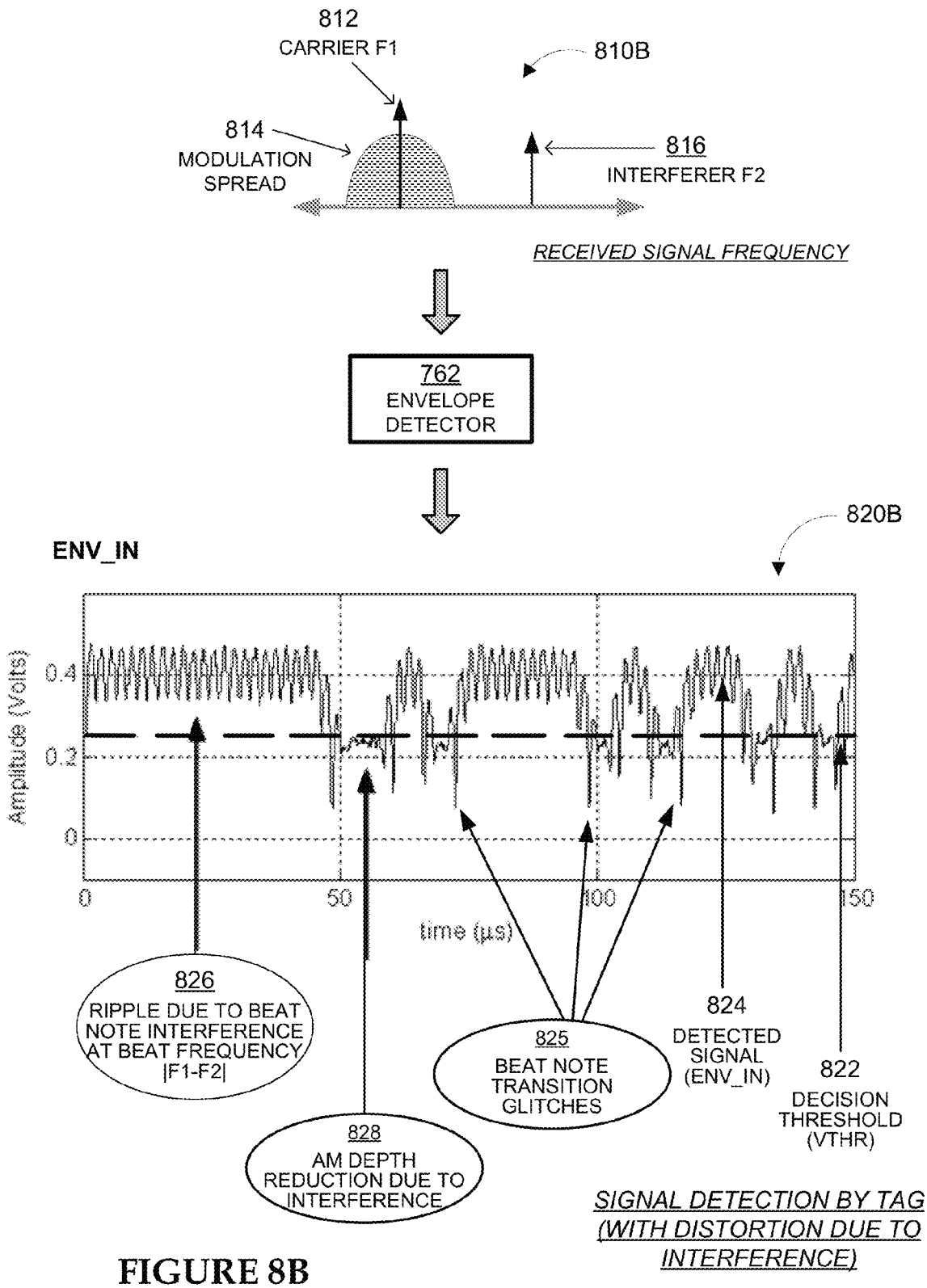
FIG. 8B is presented for showing how the signal of FIG. 8A can be distorted due to interference.

FIG. 8B is presented for showing how the signal of FIG. 8A can be distorted due to interference. Interference can be from intentional and unintentional signals, transmitted at any frequency.

A diagram 810B shows the frequency distribution of the received signal. This includes the reader wave described above, in connection with diagram 810A. In addition, an interferer produces an interfering wave, which has a carrier frequency F2 816. In this particular case, F2 can be close enough, e.g. in a nearby channel, to even produce a beat note with F1. Although CW interferer 816 is shown in diagram 810B as unmodulated, it might alternately be modulated.

The received signal is received by envelope detector 762, along with any beat notes. The interference may result in a number of distortions in the detected signal, as shown in another diagram 820B.

Diagram 820B illustrates example distortions as a result of interference. The vertical axis represents the amplitude of detected signal ENV_IN. The horizontal axis represents time. Similarly as with diagram 820A, there are shown detected signal (ENV_IN) 824 and decision threshold (VTHR) 822.

Signal 824 includes distortions. For example, according to comment 825, signal 824 includes beat note transition glitches. Moreover, according to comment 826, signal 824 includes ripple due to beat note interference. The ripple has a beat frequency |F1-F2|. Further according to comment 828, signal 824 includes Amplitude Modulation (AM) depth reduction 828.

The distortions shown in diagram 820B can cause the signal to cross decision threshold 822 erroneously. When the signal crosses the decision threshold erroneously, one or more artifact features result in the signal that is eventually digitized at node 782. Such may result in misdetection or missing of a data packet. And this can be hard to control—in the presence of interference it may be difficult to set the decision threshold with an adequate margin.

Figure 9:
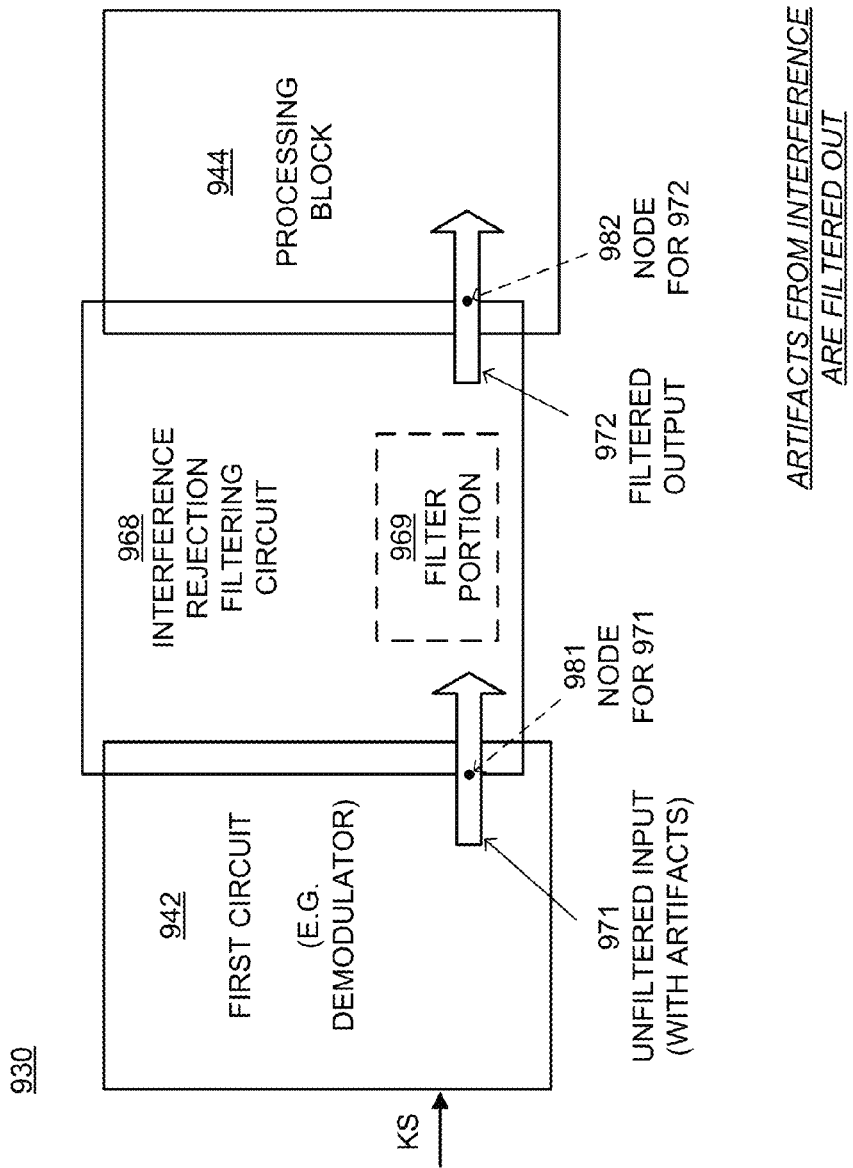
FIG. 9 is a partial block diagram of a tag circuit including an interference rejection filtering circuit according to embodiments.

FIG. 9 is a partial block diagram of a tag circuit 930 according to embodiments. Circuit 930 includes a first circuit 942, an interference rejection filtering circuit (IRF) 968, and a processor 944. These three components are shown overlapping in part, because in some embodiments they share components.

In particular, first circuit 942 is shown receiving a signal KS that is ultimately derived from a wireless RF signal received by the tag. For example, circuit 942 can include a demodulator, such as demodulator 742 described above. In addition, it could include other circuits, such as a preprocessing filter that could be analog, and so on.

Circuit 942 can derive an unfiltered input 971 responsive to signal KS. Unfiltered input 971 can have any number of forms, or combination of forms. In some embodiments, unfiltered input 971 includes one or more numbers, as will be seen below. In some embodiments, unfiltered input 971 is one or more signals, which convey information. Such signals can be digital, i.e. have waveforms with transitions between high and low values. Other ways will also be envisioned for unfiltered input 971 to convey the requisite information, in view of the present description.

The wireless RF signal can include distortion due to interference, as per the above. Accordingly, unfiltered input 971 can include one or more artifact features deriving from the distortion. Examples of those will be described later in this document.

IRF 968 is arranged to receive unfiltered input 971. For example, if unfiltered input 971 is rendered as a signal, it can be received over a node 981. IRF 968 can further generate a filtered output 972. Filtered output 972 can be generated from unfiltered input 971 by detecting and removing one or more of the above-mentioned artifacts. This way, filtered output 972 does not include the artifact features of unfiltered input 971.

In addition, filtered output 972 can have any number of forms, as was possible with unfiltered input 971. So, filtered output 972 can be one or more numbers, one or more signals that convey information, etc. Such signals can be digital, etc. Plus, other ways will also be envisioned for filtered output 972 to convey the requisite information, in view of the present description.

Processor 944 can be made in any way known in the art, such as similarly with processor 544. Moreover, processor 944 is arranged to receive filtered output 972. For example, if filtered output 972 is rendered as a signal, it can be received over a node 982. Processor 944 can also perform one or more operations responsive to receiving filtered output 972. These operations are more robust, since the artifact features of unfiltered input 971 are not received by processor 944.

Interference Rejection Filtering circuit (IRF) 968 is now described in more detail. IRF 968 may be implemented in any number of ways, and many ways will be apparent to a person skilled in the art in view of the present description, and also of the methods of the invention.

IRF 968 preferably includes a filter portion 969. This is different from any preprocessing filter that might be included in first circuit 942. Filter portion 969 is operable to identify features of unfiltered input 971, and to apply to them a first criterion, as will be described in more detail below. Features that meet the first criterion are thus detected as artifact features, arising from a distortion due to the interference. The detected features can thus be removed. Features that do not meet the first criterion can be further deemed legitimate, and be included in the filtered output. Thus, the filtered output of IRF 968 is generated from unfiltered input 971.

As will be seen below, the first criterion is actually a filter characteristic. The characteristic of filter portion 969 may be fixed, or adjustable. Adjustment may be of the whole characteristic, or of only thresholds, and so on.

Figure 10:
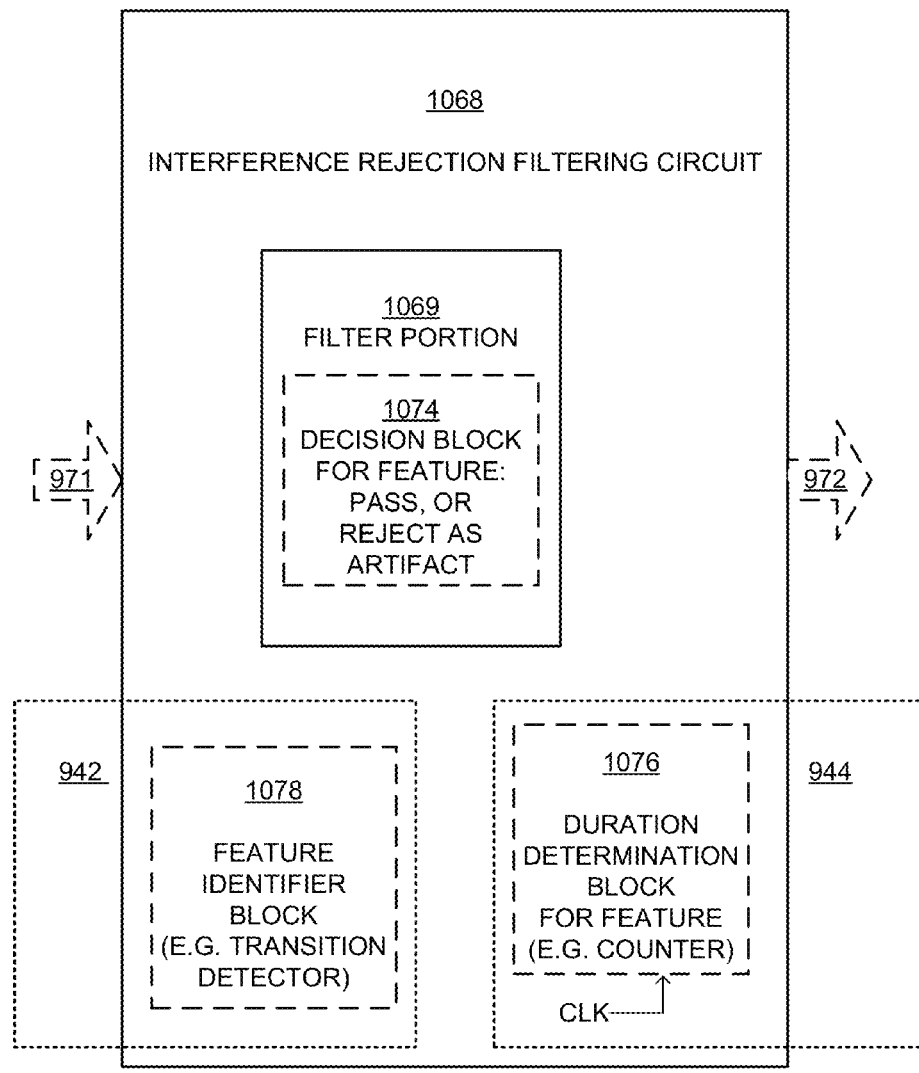
FIG. 10 is a block diagram showing possible embodiments of an interference rejection filtering circuit, such as that of FIG. 9.

FIG. 10 is a block diagram of an interference rejection filtering circuit (IRF) 1068, which can be similar to IRF 968 of FIG. 9. IRF 1068 receives unfiltered input 971, and generates filtered output 972 as per the above.

In addition, potentially overlapping blocks are shown, such as first circuit 942 and processor 944 of FIG. 9. These potentially overlapping blocks are shown to illustrate how some of the components of IRF 1068 can be shared in embodiments.

IRF 1068 includes a filter portion 1069, which in some embodiments operates similarly to filter portion 969 described above. In this embodiment, IRF 1068 includes a decision block 1074. Decision block 1074 can determine whether an identified feature of unfiltered input 971 meets the first criterion. If so, the identified feature is detected as an artifact, and rejected by not being included in filtered output 972. If not, then the feature is deemed legitimate, and is included in filtered output 972.

In a number of embodiments, the first criterion for determining whether a feature is an artifact or not is related to its time duration. For example, a feature can be deemed to be an artifact feature if its time duration is less than a low threshold time.

In some of these embodiments, a duration determination block 1076 can determine the time duration of an identified feature. The learned time duration is thus input in decision block 1074, to make the decision.

It will be appreciated that duration determination block 1076 thus performs a function of IRF 1068. In some embodiments, it can be shared with processor 944.

In some embodiments, duration determination block 1076 can receive substantially periodic samples, such as a clock signal CLK. In addition, duration determination block 1076 includes a counter that can count, responsive to the received samples, an artifact number for the time duration of an identified feature, while the identified feature is taking place. An artifact number is thus generated from the counting, which indicates the time duration of the identified feature. In those cases, the first criterion is met if the artifact number is less than a low number, which corresponds to the low threshold time.

A feature identifier block 1078 is optionally also included, which can identify a feature of unfiltered input 971. Block 1078 can be a part of IRF 1068, or be considered instead to be a part of another circuit such as first circuit 942, or considered shared with it, and so on. Alternately, feature identifier block 1078 can be simply considered to be a portion that identifies transitions, such as described above.

Filter portion 1069 can then make a decision whether the feature identified by block 1078 is a legitimate feature to be passed, or an artifact to be rejected. In addition, if duration determination block 1076 is provided, it can operate to determine the duration of the feature identified by block 1078.

In some embodiments, an envelope of the wireless signal received by the tag includes transitions between two values. The values can be a high value, for example corresponding to full Continuous Wave (CW), and a low value, corresponding to the full modulation depth. The low value need not be zero.

In these embodiments, unfiltered input 971 can include transitions between a high extreme value and a low extreme value, which correspond respectively to the transitions of the wireless signal. In such cases, feature identifier block 1078 can include a transition detector, which can identify at least some of the transitions of unfiltered input 971. In some of those embodiments, the transition detector of feature identifier block 1078 can be shared with a transition detector of first circuit 942. For example, first circuit 942 can be implemented using demodulator 742, where comparator 765 generates a waveform with the transitions at node 782.

Not all embodiments need to have shared components. An example is described below.

Figure 11:
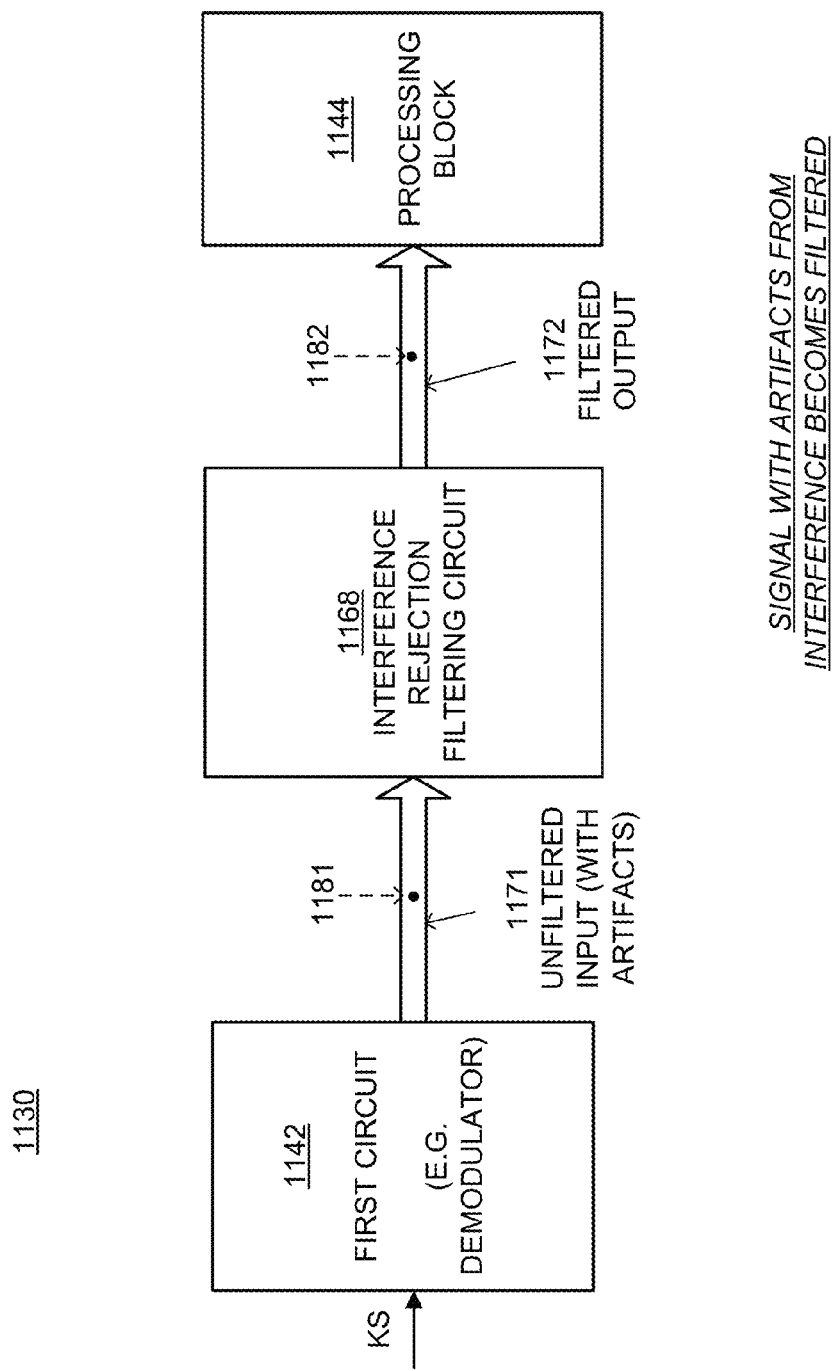
FIG. 11 is a block diagram showing an embodiment where an interference rejection filtering circuit is distinct from other components.

FIG. 11 is a block diagram 1130, showing an embodiment where components are distinct. Indeed, a first circuit 1142, an IRF 1168, and a processing block 1144 provided, all of which can be made in view of what is described in this document. None of them share a component. IRF 1168 receives an unfiltered input 1171, similar to unfiltered input 971; for example, if it can include a signal at node 1181. IRF 1168 then generates a filtered output 1172, similar to filtered output 972; for example, if it can include a signal at node which can include numbers or be a signal at node 1182.

The features are now described in more detail, along with what is deemed a legitimate feature for passing through the IRF, and what is deemed an artifact feature for rejecting.

As mentioned above, unfiltered input 971 can include transitions between a high extreme value and a low extreme value. Such implementations are called digital implementations, and are preferred, because they can achieve fine resolution easily, for determining which features to pass and which to reject as artifacts. This enhances performance in the face of interference.

In cases where transitions are used, the features of interest of unfiltered input 971 can be defined in terms of the transitions. For example, a feature can be a pattern of two of the transitions. The pattern can be two successive transitions, or two transitions having the same direction.

The information about the transitions can be conveyed in any suitable way. For example, the unfiltered input can include input data about the transitions. In addition, the filtered output can include output data about the transitions.

An example is now given, where transition information is conveyed as a signal.

Figure 12A:
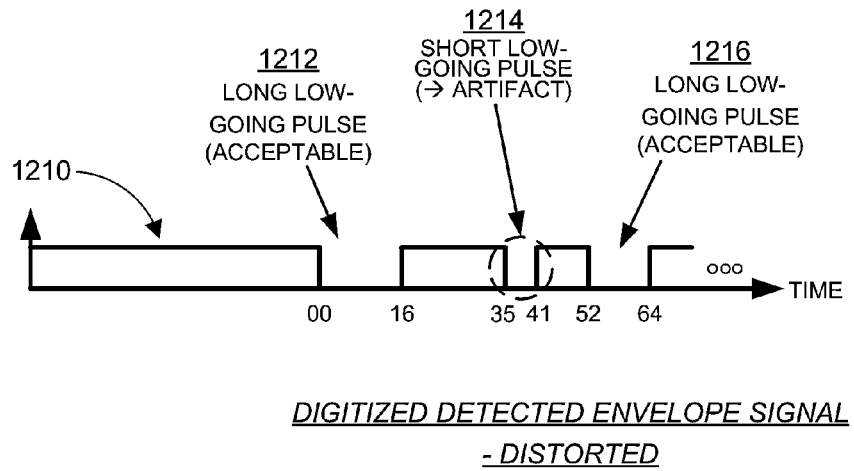
FIG. 12A is a diagram illustrating how an unfiltered input can be rendered as a signal with an artifact feature.

FIG. 12A is a diagram illustrating how an unfiltered input can be rendered as a signal 1210, shown along a time axis. Signal 1210 is digital, in that it has two extreme values (high and low), and transitions between them. Transitions occur at time intercepts 00, 16, 35, 41, 52 and 64. Time units are arbitrary, and here they can be clock cycles of clock signal CLK of FIG. 10.

It will be recognized that signal 1210 can be the type of signal generated by digitizing the waveform of FIG. 8B. So, it can be a signal presented at any one of nodes 782, 981, and 1181.

Here the feature of interest is low-going pulses, which could be artifacts, given that signal 1210 was formed by digitizing a waveform of the type shown in FIG. 8B. A low-going pulse is defined two successive transitions, namely a high-to-low transition followed by a low-to-high transition.

In signal 1210, three low going pulses 1212, 1214, 1216 can be identified from their respective transitions. Of those, pulses 1212 and 1216 are deemed long enough, and therefore acceptable for passing, but pulse 1214 is deemed too short, and is thus detected as an artifact, for rejecting. In this case, the time duration of pulse 1214 can be compared with a threshold low time, and be rejected on the basis that it is too short.

Figure 12B:
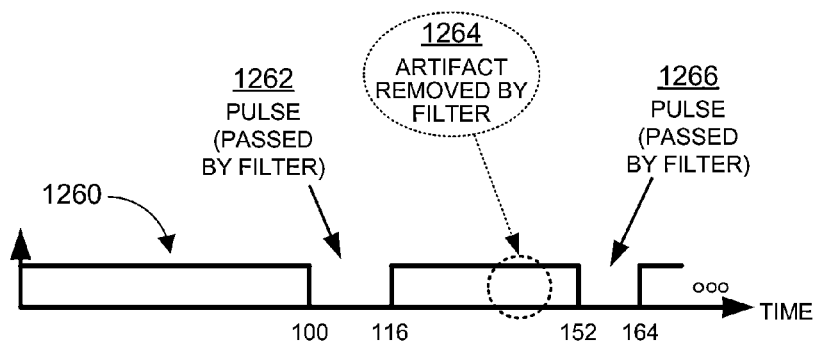
FIG. 12B is a diagram illustrating a filtered output generated according to embodiments as a signal from the unfiltered input of FIG. 12A, but without the artifact feature.

FIG. 12B is a diagram illustrating a filtered output generated as a signal 1260 from the unfiltered input of FIG. 12A. Signal 1260 is digital, as is signal 1210. Signal 1260 is shown along a time axis, with intercepts occurring later in time than corresponding intercepts of signal 1210.

It will be observed that signal 1260 includes low-going pulses 1262, 1266, corresponding to acceptable pulses 1212, 1216, respectively. According to comment 1264, there is no pulse corresponding to pulse 1214 of signal 1210 that was deemed an artifact feature. It can be seen therefore, that the artifact has been rejected.

Digital signal 1260 could therefore be the reconstructed signal, with the artifact removed. It could be the signal present on nodes 982, 1182, for use by the processor. In other embodiments, however, digital signal 1260 is never actually reconstructed, and all that is received by the processor is information about the legitimate transitions of such a signal.

Another example is now given, where the same transition information as in the immediately previous two drawings is conveyed equivalently as numbers, instead.

Figure 12C:
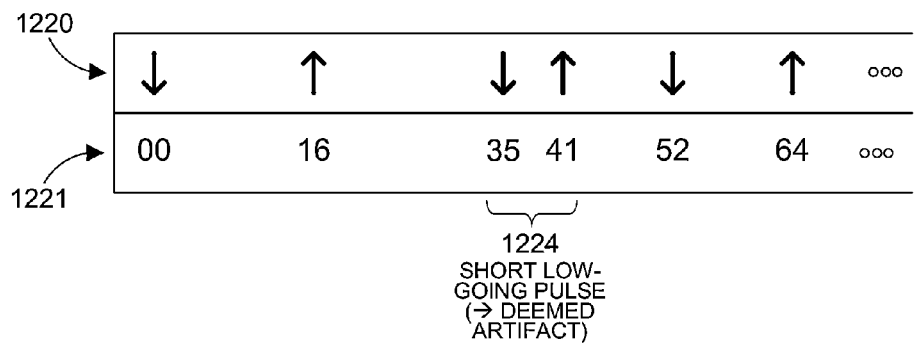
FIG. 12C is a diagram illustrating how the unfiltered input of FIG. 12A may be equivalently rendered as transition times according to embodiments, for identifying the features and detecting the artifact feature.

FIG. 12C is a diagram illustrating the unfiltered input of FIG. 12A rendered equivalently as transition times. A series 1220 shows only the transitions of digital signal 1210. High-to-low transitions are shown as downward pointing arrows, and low-to-high transitions are shown as upward pointing arrows. A corresponding series 1221 shows only the transition times of the transitions of series 1220.

It will be observed that pulse 1214 is now rendered as a transition pair 1224 of two transition times, namely 35 and 41. The time duration of pulse 1214 is given from the values of transition pair 1224, namely the difference of 41−35=6. In this case, the time duration has been counted as an artifact number, which can be compared with a low number, and be rejected on the basis that the artifact number is too low.

Figure 12D:
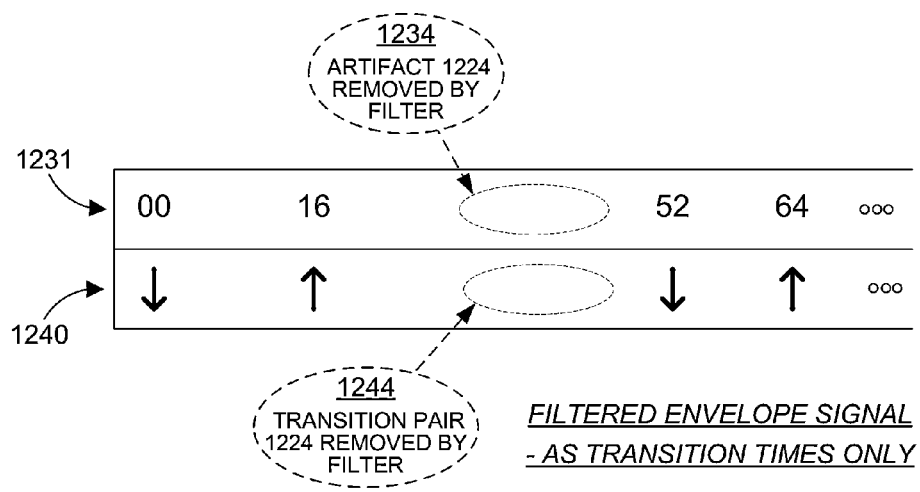
FIG. 12D is a diagram illustrating how the transition times of FIG. 12C may be filtered for rejecting an artifact feature according to embodiments, to yield the equivalent filtered output of FIG. 12B.

FIG. 12D is a diagram illustrating how the transition times of the previously described series 1221 may be filtered for rejecting an artifact feature.

A series 1231 is made from series 1221. The same transition times can be included, except that, according to a comment 1244, transition pair 1224 has been eliminated. This is equivalent of removing pulse 1214, since it is detected as an artifact. Accordingly, series 1231 is a rendering of the filtered output.

Another, optional series 1240 represents in transitions what the time intercepts of series 1231 stand for. Series 1240 has those transitions of series 1220 that are indicated by the transition times of series 1231 as acceptable. According to a comment 1244, transition pair 1224 has been eliminated. Accordingly, series 1240 is another rendering of the filtered output. Another, equivalent such rendering would be interrupts timed according to series 1231, and so on.

It will be observed that the transitions of series 1240 could be further used to reconstruct the actual signal 1260 of FIG. 12B, which is again another possible described rendering of the filtered output. Such is not necessary, however, and the numbers of series 1231 or other equivalent rendering of the filtered output can be input in the processor after the IRF. Where, in the subsequent description, waveforms of digital signals are given for the unfiltered input or the filtered output, these are only intended as visually expressive representations, and other renderings are equivalently intended.

Methods according to the invention are now described, which are also known as processes. These methods can also be practiced by the systems, structure, devices and circuits taught by this document.

Figure 13:
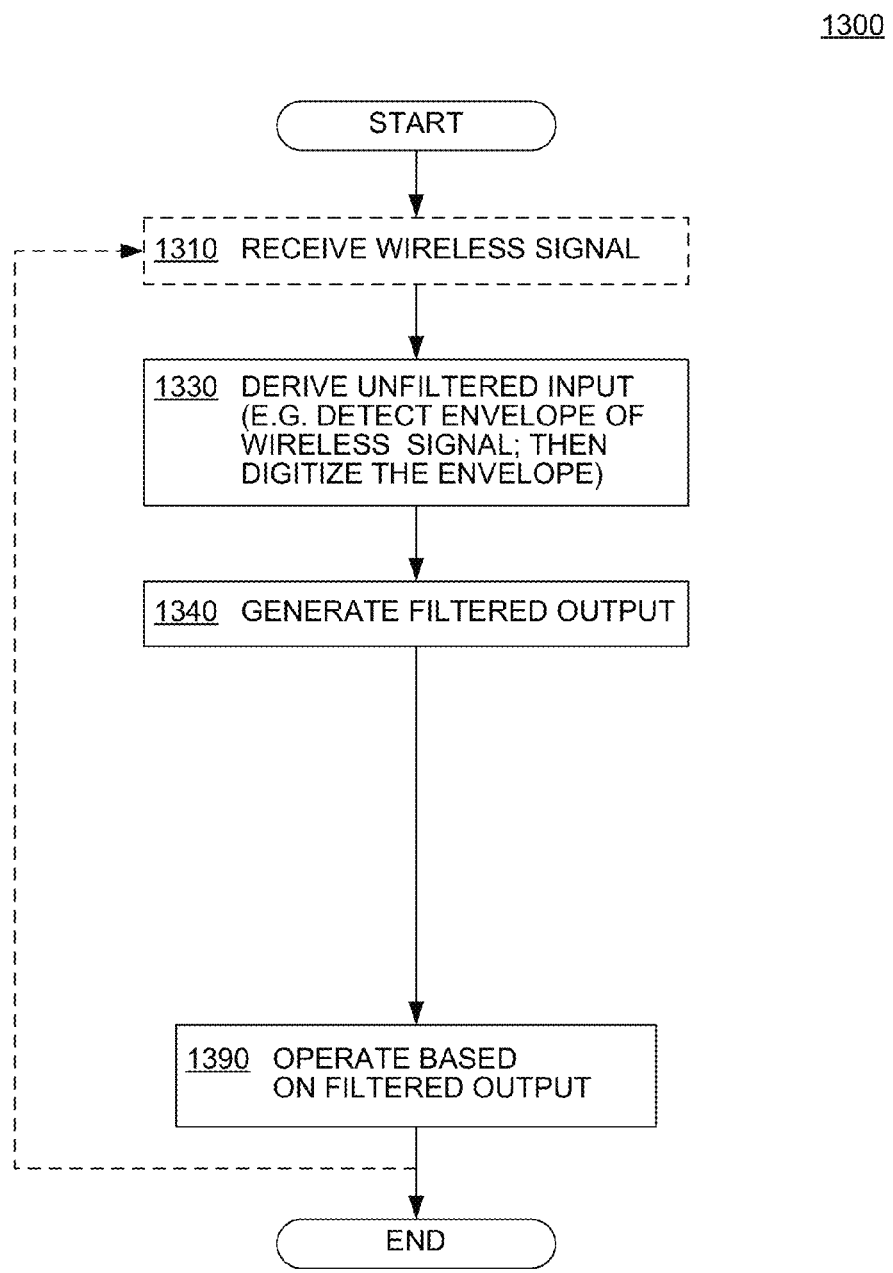
FIG. 13 is a flowchart of a process for rejecting interference according to embodiments.

FIG. 13 is a flowchart 1300 of a process for rejecting interference according to embodiments. In the below, the order of operations is not constrained to what is shown, and different orders may be possible. In addition, actions within each operation can be modified, deleted, or new ones added without departing from the scope and spirit of the invention. Plus other, optional operations and actions can be implemented with these methods, as will be inferred from the earlier description. In addition, it will be recognized that a number of what is recited below is explained in more detail elsewhere in this document.

In flowchart 1300, according to optional operation 1310, a wireless signal is received by an RFID tag. The signal can be received in any number of ways, such as by an antenna and so on. The received wireless signal could be distorted by interference, such as shown in FIG. 8B.

According to a next operation 1330, an unfiltered input is derived from the wireless signal. The unfiltered input includes one or more artifact features owing to the distortion of the wireless signal due to interference.

This may be accomplished in any number of ways. For example, an envelope of the received wireless signal can be detected. Detection can be by any number of ways, such as by an envelope detector circuit, which could include a diode, etc. In addition, the detected envelope may be digitized, such as by a slicer. Alternately, digitizing can be considered equivalently as part of the subsequent operation of filtering, etc.

According to a next operation 1340, a filtered output is generated, by filtering the unfiltered input to remove one or more of the artifact features. The removal of the artifact feature(s) can be performed in any number of ways, as also described elsewhere in this document.

According to a next operation 1390, an operation is performed based on the filtered output. The operation may include responding to the reader, storing a value in a tag memory, modifying a value in a tag state machine, and the like. Operation 1390 is performed more robustly, because the filtered output no longer includes the one or more artifact features of the unfiltered input.

Various filtering possibilities are now described. These apply both to the circuits and to the methods described above. So, an action or characteristic described for IRF 968 is also applicable to an operation of process 1300.

In terms of jargon, for purposes of this document, IRF 968 can thus be a low pass filter, a band pass filter, or a high pass filter, where the terms "low pass", "band pass", and "high pass" refer to the range of time durations of features accepted or rejected by IRF 968. For example, a high pass filter accepts features of duration longer than a low threshold time, and rejects features of duration shorter than a low threshold time. These names are the same, but the meanings different than for other filters, which are characterized by their frequency response.

Figure 14A:
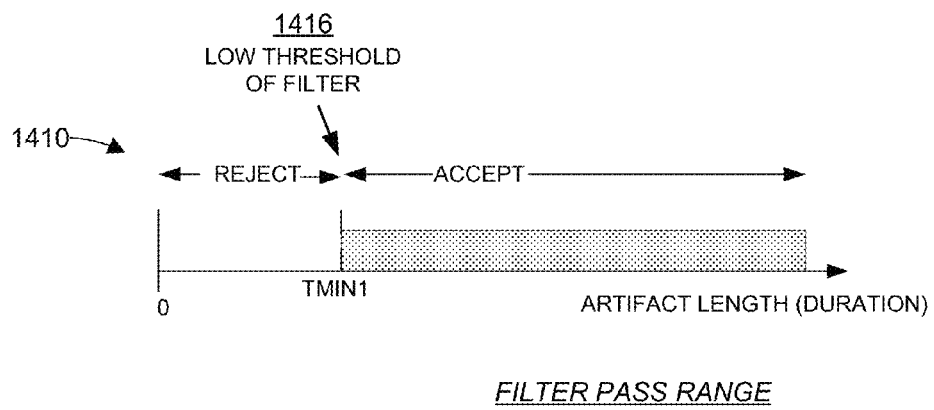
FIG. 14A is a diagram showing a possible characteristic of a filter of the IRF of FIG. 9, or of one that can be used for implementing the method of FIG. 13.

FIG. 14A is a diagram showing a possible characteristic 1410 of IRF 968. The filter with characteristic 1410 detects and removes as an artifact feature every feature with duration below a low threshold time 1416, which occurs at a time TMIN1. So, features with duration (length) less than TMIN1 are rejected as artifacts, while features above TMIN1 are passed. Accordingly, characteristic 1410 rejects short artifact features, such as beat note glitches and the like.

Figure 14B:
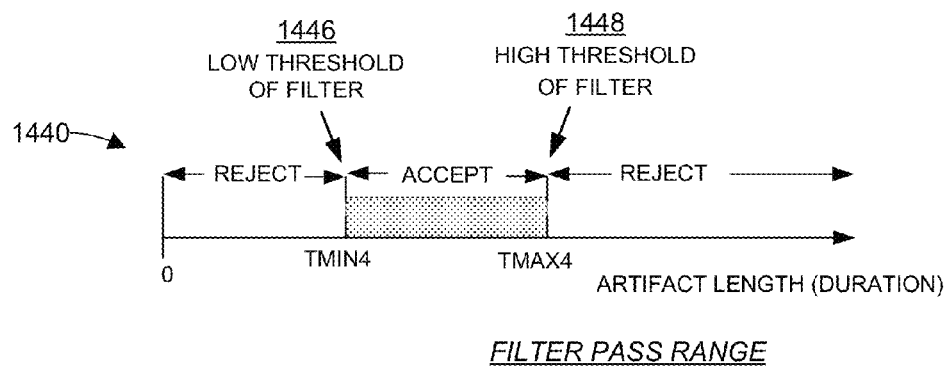
FIG. 14B is a diagram showing another possible characteristic of a filter of the IRF FIG. 9, or of one that can be used for implementing the method of FIG. 13.

FIG. 14B is a diagram showing another possible characteristic 1440 of IRF 968. The filter with characteristic 1440 is configured to accept features within a preset range between a low threshold time 1446, which occurs at a time TMIN4, and a high threshold time 1448, which occurs at a time TMAX4. This range is also called the pass range. In fact, the difference between TMAX4 and TMIN4 is also termed aperture size of the filter. Any features with duration less than TMIN4 or more than TMAX4 are rejected as artifact features. As such, characteristic 1440 enables rejection of both short features, as well as features that are too long.

A particular advantage of a filter with characteristic 1440 can be realized when a feature is expected whose duration is known in advance with some certainty, such as a delimiter. In those cases, the pass range or aperture size can be narrow when, thereby rejecting very many irrelevant signals. In those cases, the value of TMIN4 might be large, thus rejecting as artifacts features of short duration.

According to additional optional embodiments, these filter characteristics can even be adjustable. Such are now described in more detail.

Figure 15:
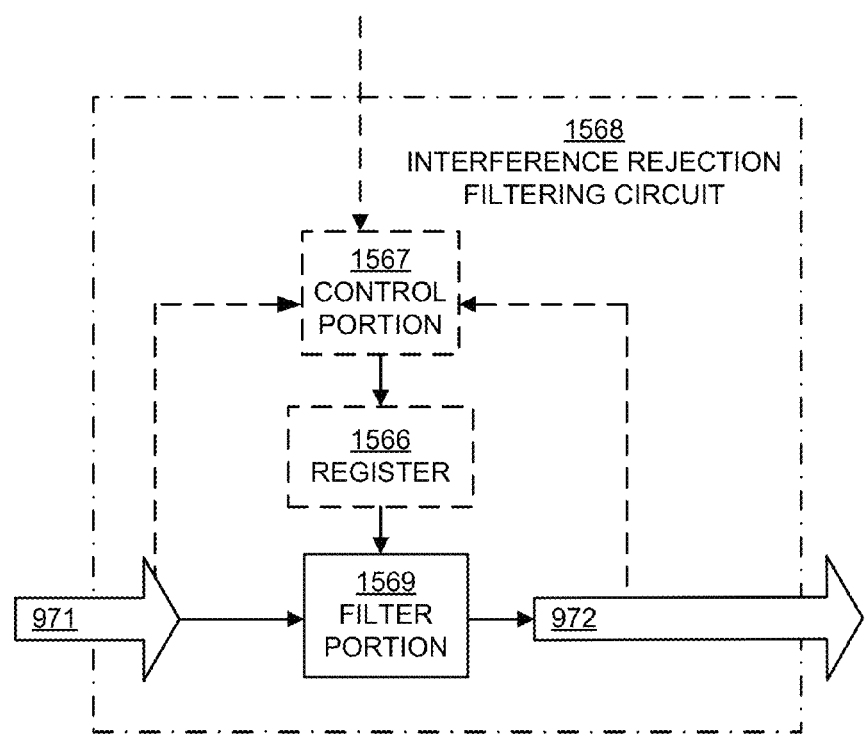
FIG. 15 is a block diagram illustrating an embodiment for the IRF of FIG. 9 that uses a single filter portion.

FIG. 15 is a block diagram of an IRF 1568 according to embodiments. Some of the above made descriptions can be used for this explanation.

IRF 1568 includes a filter portion 1569, which can be made as generally described for filter portion 969. Filter portion 1569 is arranged to receive unfiltered input 971, and to generate filtered output 972, by removing an artifact feature from unfiltered input 971.

IRF 1568 also includes a control portion 1567, which is adapted to adjust the characteristic of filter portion 1569. Adjustment can be in any suitable way, such as by control portion 1567 transmitting a control signal. Filter portion 1569 can receive the signal directly.

Accordingly, control portion 1567 adjusts the characteristic of filter portion 1569. This in turn adjusts what feature of unfiltered input 971 will be detected as an artifact feature and rejected, and so on. Adjustment can be of the whole characteristic. Alternately, adjustment can be of the time thresholds only.

Adjustment may be made based on a number of inputs, as is suggested by the dashed lines going into control portion 1567. For example, filter parameters may be dictated by an express received signal from an RFID reader. Or the parameters may be adjusted based on another circuit within the RFID tag, such as a circuit detecting interference or a circuit detecting an error rate, such as bit error rate, packet error rate, and which could be part of the processor. Or a transmission data rate may be determined from unfiltered input 971, or filtered output 972. For example, in a situation where the expected pulse width is known, a narrow filter pass range (aperture) may be more appropriate than a wider one. Some more examples are given later in this document.

In some of these embodiments, IRF 1568 also includes a memory register 1566. Register 1566 can store the characteristic dictated by control portion 1567. Then storing could be made responsive to the control signal transmitted by control portion 1567, and filter portion 1569 could receive what is stored in memory register 1566. Where only the thresholds are adjusted, only their values may need to be stored.

The filter characteristic, or just thresholds, may alternately be adjusted by selecting one of a plurality of filter portions, each having a different characteristic. The selection itself effectuates the adjustment, and may be performed as per the above. An example is now given, using multiple filter portions.

Figure 16:
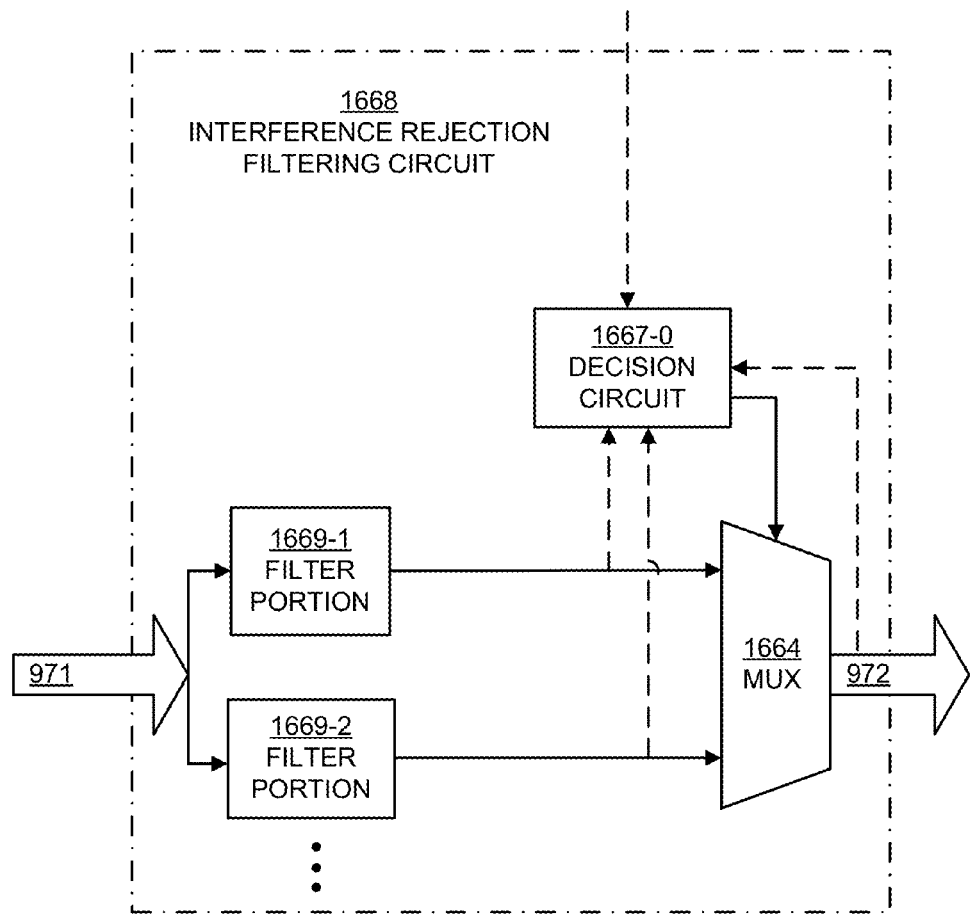
FIG. 16 is a block diagram illustrating an embodiment for the IRF of FIG. 9 that uses multiple filter portions.

FIG. 16 is a block diagram of an IRF 1668 according to embodiments. IRF 1668 includes filter portions 1669-1, 1669-2, . . . , which can be made as generally described for filter portion 969. One or more of filter portions 1669-1, 1669-2, . . . , can be coupled to receive unfiltered input 971. Each can produce a filtered version of unfiltered input 971, by removing one or more artifact features. Filter portions 1669-1, 1669-2, . . . , can have different characteristics, in which case they would detect and remove different features as artifact features. For example, each may have a different pass range, covering a predetermined aperture.

IRF 1668 also includes a multiplexer 1664, which is coupled to receive the filtered versions of filter portions 1669-1, 1669-2, . . . , and choose only one of them to be filtered output 972.

A decision circuit 1667-0 controls multiplexer 1664, and therefore controls which one of filter portions 1669-1, 1669-2, . . . , will operate on unfiltered input 971. Decision circuit 1667-0 can be controlled in ways analogous to how control portion 1567 is controlled.

Other extensions are also possible. For example, filter portions 1669-1, 1669-2, . . . , may be further controlled by respective optional control portions, as was shown in FIG. 15.

As will be described later, one of filter portions 1669-1, 1669-2, . . . , may be dedicated for wide pass range when the data rate is not known. Another may be adjustable to a group of smaller pass ranges, based on the data rate of the expected packet. In that example, decision circuit 1667 may not only control selection of the wide aperture or adjustable aperture filter, but also provide feedback to the control portion of the adjustable aperture filter, such that the aperture is adjusted, for example based on the data rate.

Figure 17:
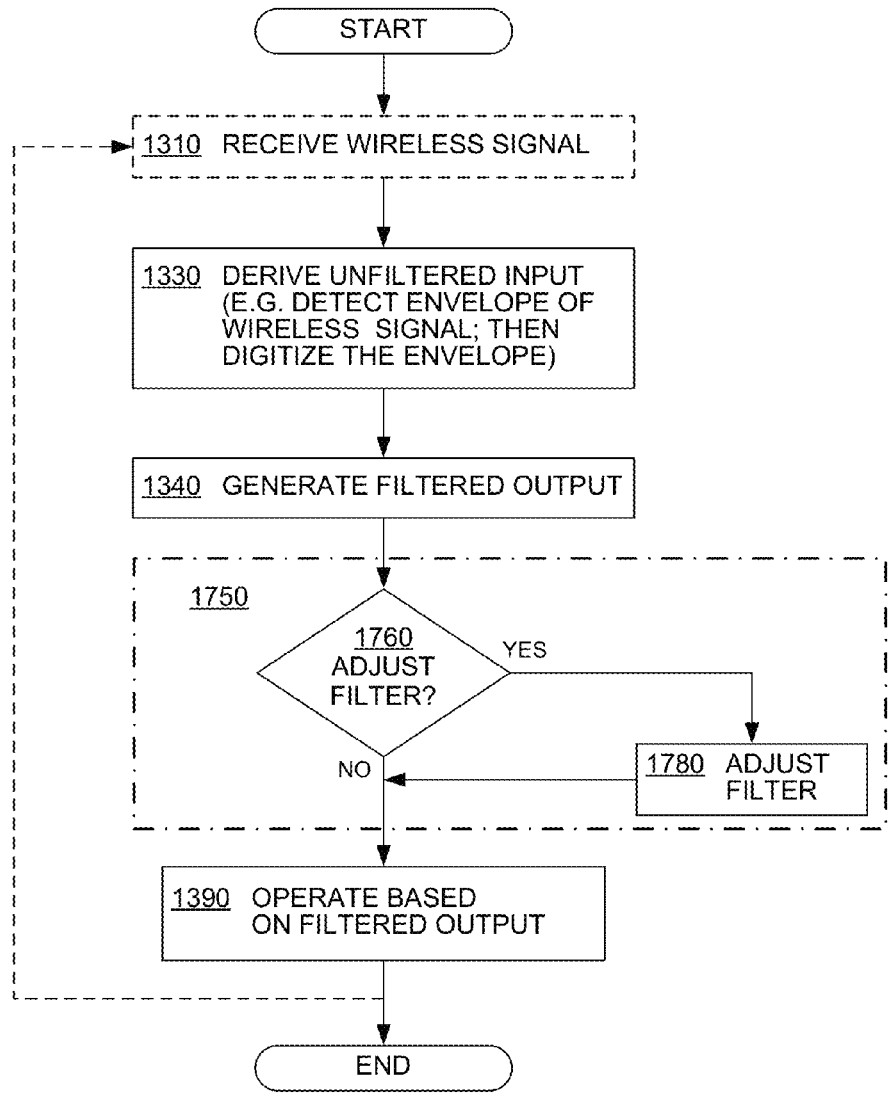
FIG. 17 is a flowchart for the process of FIG. 13, further according to embodiments where a filter characteristic can be adjusted.

FIG. 17 is a flowchart 1700 for the process of FIG. 13, further according to embodiments where a filter characteristic can be adjusted.

Operations 1310, 1330, 1340 and 1390 can be the same as described in conjunction with FIG. 13. Flowchart 1700 includes, additionally, an adjustment operation 1750 following operation 1340. Adjustment operation 1750 is best described in terms of two sub-operations.

According to a decision sub-operation 1760, a determination is made whether the filter will be adjusted. If no, then execution proceeds to operation 1390.

If the filter is to be adjusted, then according to operation 1780, the filter becomes adjusted. Then execution again proceeds to operation 1390.

Adjustment can be of the whole characteristic, or only of thresholds. Examples of adjusting thresholds are now given.

Figure 18A:
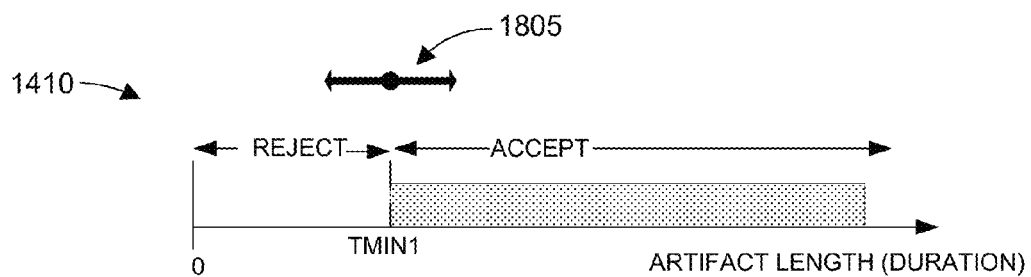
FIG. 18A is a diagram showing how the filter characteristic of FIG. 14A can be adjusted, for example in the circuits of FIGS. 15 and 16, or according to the process of FIG. 17.

FIG. 18A is a diagram showing how filter characteristic 1410 of FIG. 14A can be adjusted.

Filter characteristic 1410 is adjustable in the sense that TMIN1 can be changed according to arrow 1805. Changing can be by decreasing or increasing, changing accordingly the behavior of the filter, in detecting what features to pass and what to reject as artifact features. The value of TMIN1 can be stored in a register.

Figure 18B:
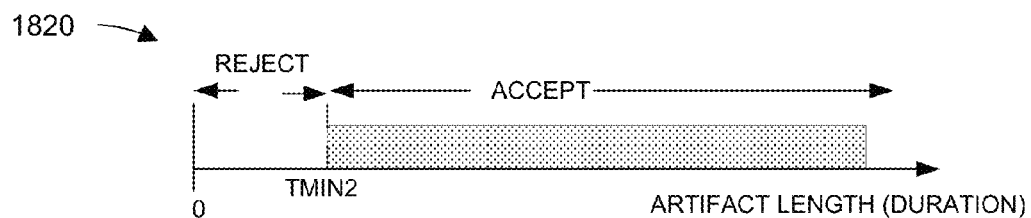
FIGS. 18B, and 18C are diagrams showing the filter characteristic of FIG. 18A, after it has been adjusted various ways.

In FIG. 18B, the filter characteristic has been adjusted by decreasing TMIN1 to TMIN2. A different filter characteristic 1820 results, where shorter artifact features are rejected than from characteristic 1410.

Figure 18C:
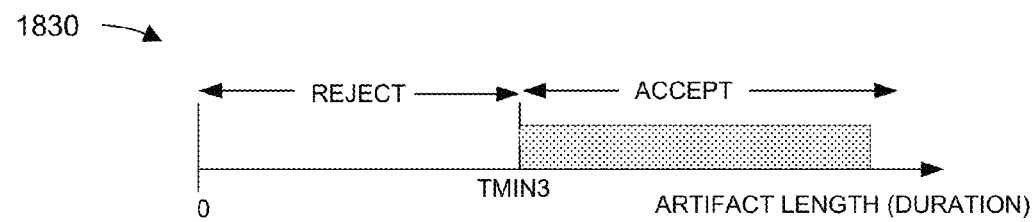

In FIG. 18C, the filter characteristic has been adjusted by increasing TMIN1 to TMIN3. A different filter characteristic 1830 results, where longer artifact features are rejected than from characteristic 1410.

Figure 19A:
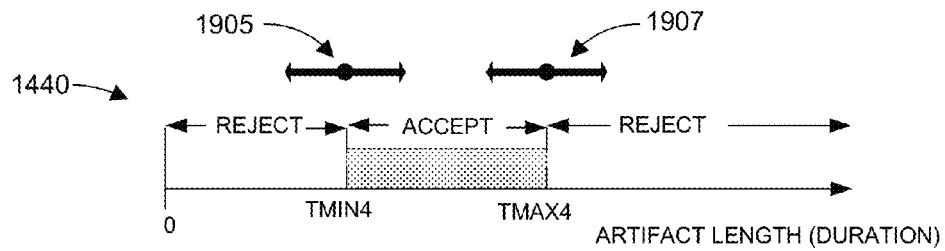
FIG. 19A is a diagram showing how the filter characteristic of FIG. 14B can be adjusted, for example in the circuits of FIGS. 15 and 16, or according to the process of FIG. 17.

FIG. 19A is a diagram showing how filter characteristic 1440 of FIG. 14B can be adjusted.

Filter characteristic 1440 is adjustable in the sense that TMIN4 can be changed according to arrow 1905, and TMAX4 can be changed according to arrow 1907. Arrow 1905 can be changed independently from arrow 1907. Change can be by either one, by decreasing or increasing, to change accordingly the behavior of the filter, in detecting what features to pass and what to reject as artifact features. So, as filter characteristic 1440 is that of a bandpass filter that passes features in the band between TMIN4 and TMAX4, the band can be adjusted.

Figure 19B:
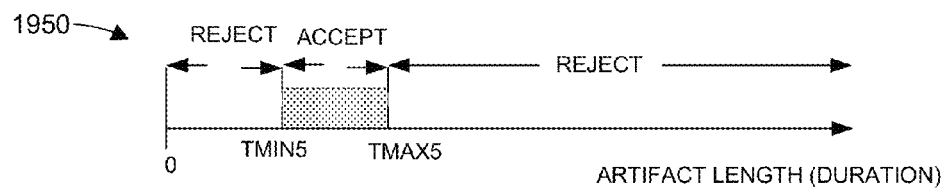
FIGS. 19B, and 19C are diagrams showing the filter characteristic of FIG. 19A, after it has been adjusted various ways.

In FIG. 19B, the filter has been adjusted by decreasing TMIN4 to TMIN5, and also decreasing TMAX4 to TMAX5. A different filter characteristic 1950 results, with a different band than characteristic 1440.

Figure 19C:
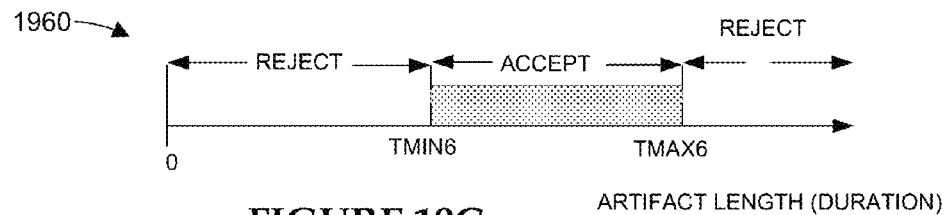

In FIG. 19C, the filter has been adjusted by increasing TMIN4 to TMIN6, and also increasing TMAX4 to TMAX6. A different filter characteristic 1960 results, with a different band than characteristic 1440.

Figure 20:
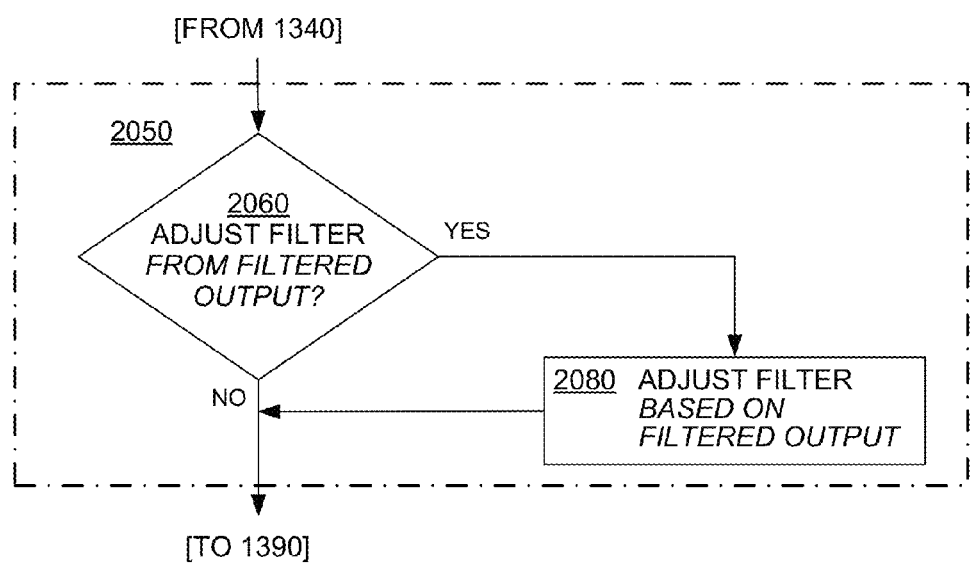
FIG. 20 is a flowchart segment for the process of FIG. 17, further illustrating embodiments where the filter characteristic becomes adjusted in view of the filtered signal.

FIG. 20 is a flowchart segment of an adjustment operation 2050, which can be an alternate for adjustment operation 1750 of process 1700. It will be appreciated that the filter characteristic becomes adjusted in view of the filtered output.

According to a decision sub-operation 2060, a determination is made whether the filter is to be adjusted based on the filtered output. If no, then execution proceeds to operation 1390.

If the filter is to be adjusted, then according to a sub-operation 2080, the filter becomes so adjusted. In some scenarios, the interference may increase due to a new source, change in an interferer's location, and the like. In such a scenario, a filter characteristic that was adequate for the less noisy environment may no longer be sufficient. By examining the filtered output and adjusting the filter based on the same, the filter may adapt to changing interference conditions better. For example, a feedback circuit may check filtered output 972 for any low-going pulses that are still getting through the filter, and accordingly control the filter portion to further narrow the pass range. Then execution again proceeds to operation 1390.

In some embodiments, the threshold may be adjusted responsive to an aspect of the filtered output 972, or even unfiltered input 971. For these embodiments, it is advantageous to think of unfiltered input 971 and filtered output 972 as series of packets. Then the aspect can be one of the packets, or a statistic of a characteristic of the packets. An example is given below.

Figure 21:
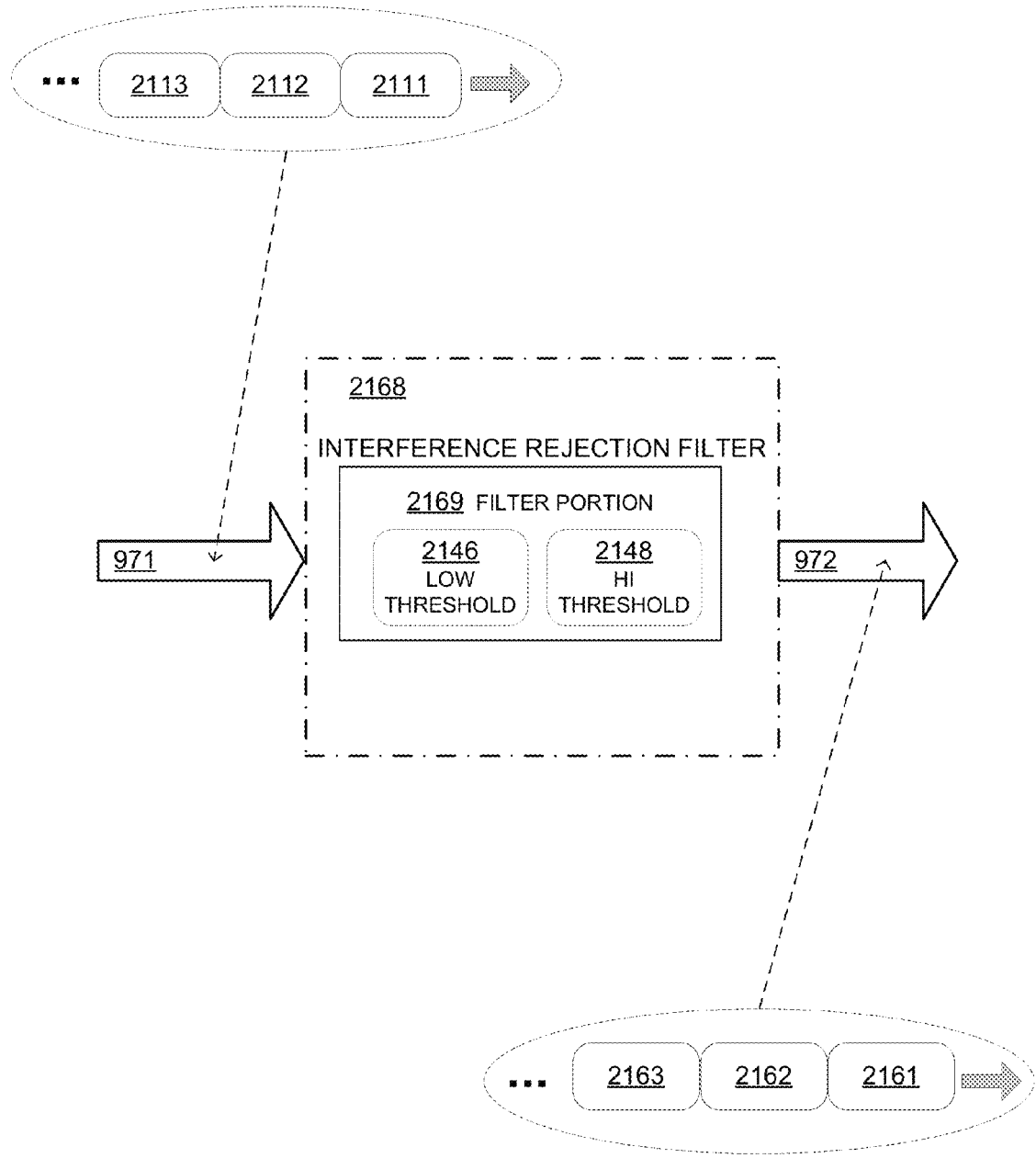
FIG. 21 is a conceptual diagram showing how the IRF of FIG. 9 can consider the incoming signal as subdivided into packets.

FIG. 21 is a conceptual diagram showing an IRF 2168 that can be similar to IRF 968. IRF 2168 receives unfiltered input 971, and generates filtered output 972.

Unfiltered input 971 can be considered as subdivided into a series of incoming packets 2111, 2112, 2113, . . . , etc. Filtered output 972 can also be considered as subdivided into a series of corresponding filtered packets 2161, 2162, 2163, . . . , etc.

Different ones of the above described packets can be dedicated to different aspects of the communication, according to various RFID communication protocols. For example, a Continuous Wave (CW) portion is employed to power the tag, a delimiter portion indicates to the tag that data is coming, and a data portion includes commands, command payload and the like. Each of these portions may be termed packets. Furthermore, additional portions dedicated to other aspects or segments within each portion may also be termed as packets.

Either incoming packets 2111, 2112, 2113, . . . , or filtered packets 2161, 2162, 2163, . . . , can be used for adjusting IRF 2168. It is preferred, however, to use filtered packets 2161, 2162, 2163, . . . , since filtering by IRF 2168 has brought them closer to the original.

Adjustment can be of the characteristic of IRF 2168, or of its parameters. For example, a low threshold time 2146 or a high threshold time 2148 can be adjusted.

In some of these embodiments, adjustment can be based on the next expected packet. In other words, the filter continuously adjusts to look for what it is expecting, and reject other signals.

Because each packet may be associated with a different operational aspect of the RFID tag, they can be used to adjust a filter parameter differently. For example, during the CW portion, the tag does not expect to decode any data, therefore there is no need to set the filter pass range to a relatively wide value.

Similarly, different data rates may require more or less strict filtering. Therefore, a packet containing data at one rate may need to be filtered at a different setting than another packet containing data at a dissimilar rate.

Or a data rate may be estimated from previous packets, to set the pass range for a present packet. The data rate may be estimated from a first packet only or from a weighted (or non-weighted) average of several previous packets.

Figure 22:
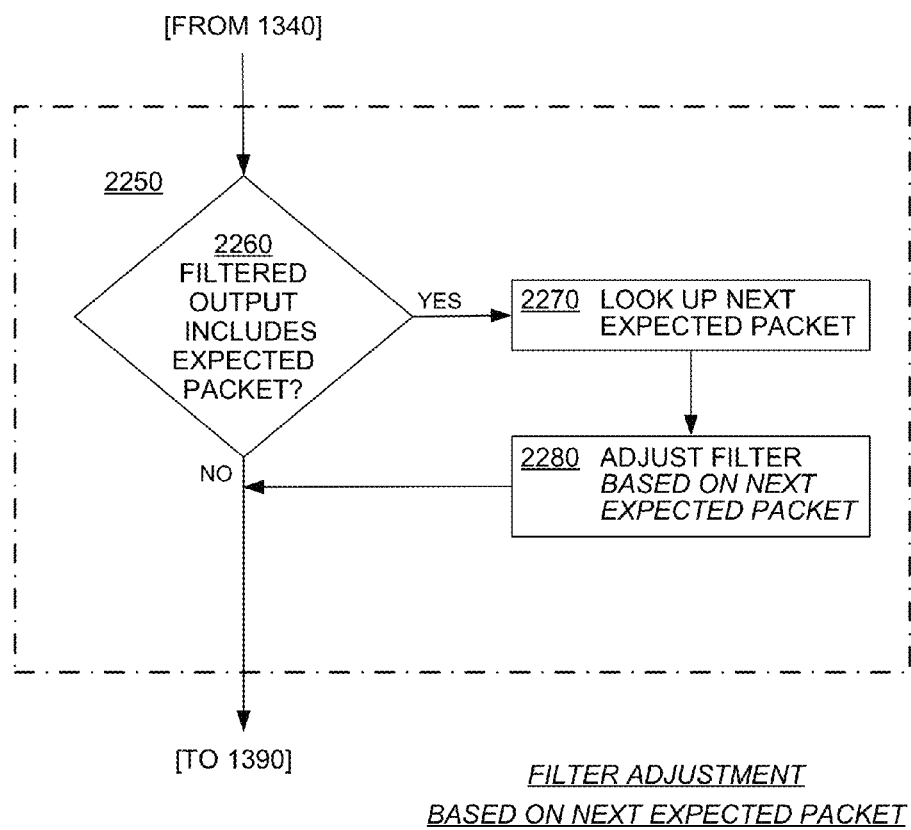
FIG. 22 is a flowchart segment for the process of FIG. 20, further illustrating embodiments where the filter characteristic becomes adjusted in view of the first signal, considered subdivided into packets.

FIG. 22 is a flowchart segment of an adjustment operation 2250, which can be an alternate for adjustment operation 2050. This also shows the preferred embodiment, where filtered output 972 is used instead of unfiltered input 971, but that is not necessary.

According to a decision sub-operation 2260, a determination is made whether filtered output 972 includes an expected packet. The expected packet can be any number of packets in RFID communication, such as a first occurring packet in an inventory round, an immediately previously occurring packet, or even a statistic of a group of previously occurring packets, etc. If the expected packet is not identified in the filtered output, then execution proceeds to operation 1390.

If instead the expected packet is identified as being included in the filtered output 972, then according to sub-operation 2270, the next expected packet is looked up, for example in terms of its value.

Then according to sub-operation 2280, the filter becomes so adjusted. Examples of such adjustment are given in more detail below. Then execution again proceeds to operation 1390.

Figure 23A:
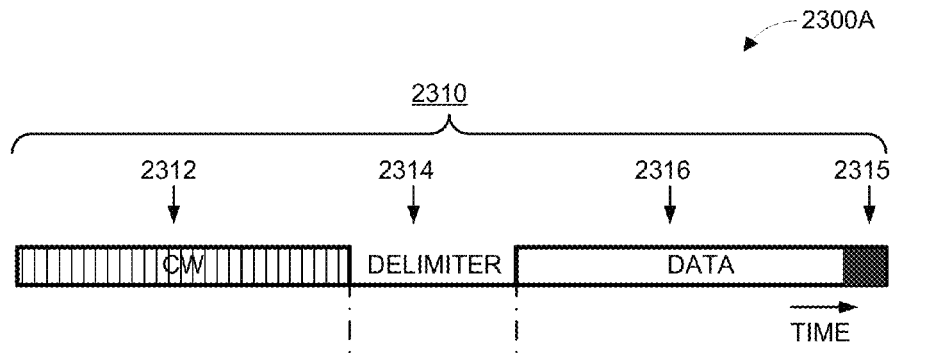
FIG. 23A is a time diagram of waveform that can be transmitted by an RFID reader, and intended to be reconstructed by a tag for correcting any distortions due to interference.

FIG. 23A is a time diagram of waveform 2300A along a time axis, of a signal that can be transmitted wirelessly by an RFID reader. A tag according to the invention can reconstruct waveform 2300A, even in the face of interference.

Waveform 2300A includes different portions 2310. These include a CW portion 2312, followed by a delimiter portion 2314, and then a data portion 2316. Data portion 2316 may be followed by yet another portion 2315 such as a CW portion, a calibration portion, and the like. These portions 2310 can be considered to be the packets.

Figure 23B:
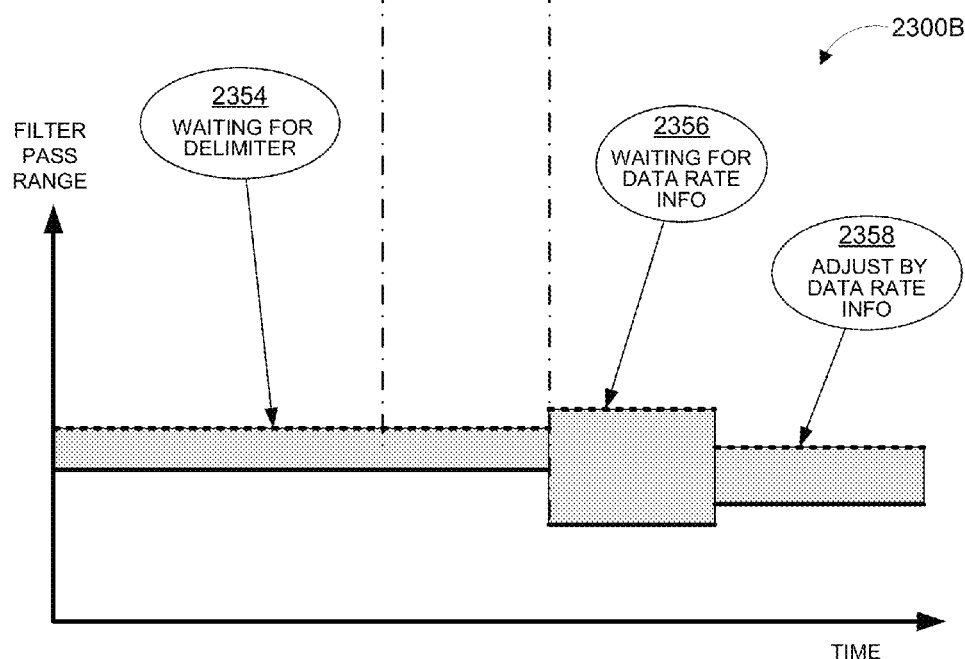
FIG. 23B is a time diagram showing embodiments of how a characteristic of an interference rejection filter can be adjusted dynamically as in FIG. 19A, 19B, 19C, and further in view of anticipating a next expected feature of the known waveform of FIG. 23A.

FIG. 23B is a time diagram 2300B showing how a characteristic of an interference rejection filter can be adjusted dynamically, as in FIG. 19A, 19B, 19C, and further in view of anticipating a next expected packet of the waveform 2300A. As will be appreciated, time diagram 2300B illustrates different pass ranges for the filter, which corresponding to the expected packets 2310.

According to a comment 2354, during CW packet 2312 and delimiter packet 2314, the pass range (shaded area) is at a narrow setting, with the filter waiting to confirm receiving delimiter packet 2314, because no data is expected to be decoded prior to that.

Once delimiter packet 2314 is detected, however, the pass range can be adjusted. For example, according to a comment 2356, it can be adjusted for optimal detection of the expected data rate information. When data rates are communicated, according to a comment 2356, the pass range can then be adjusted according to the communicated data rate, and so on.

Figure 24:
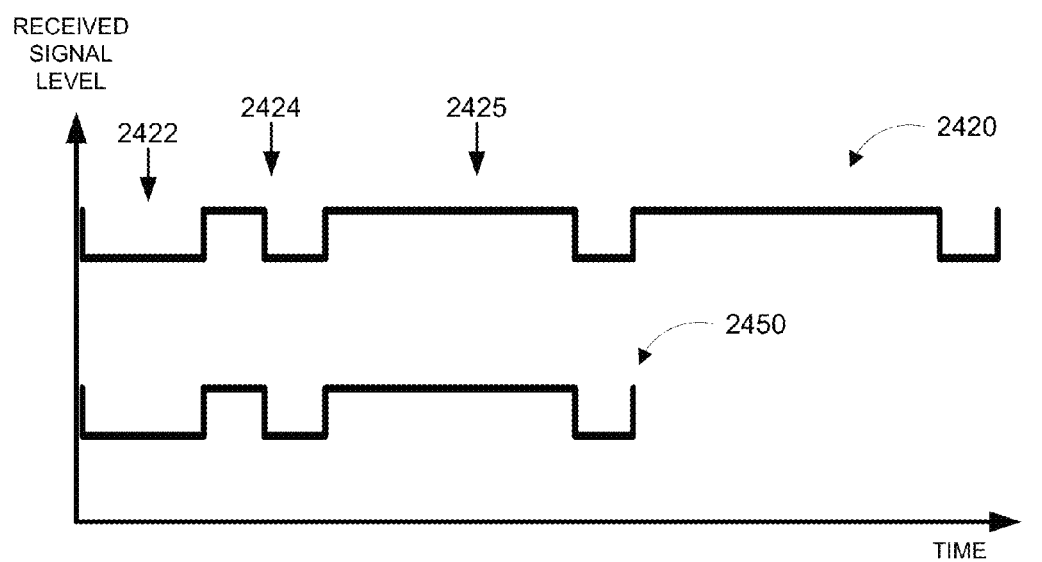
FIG. 24 shows time diagrams of possible particular versions of the waveform of FIG. 23A.

FIG. 24 shows time diagrams of possible particular versions of waveform 2300A. Both waveforms 2420 and 2450 have packets in common, which are now described.

Data is encoded onto a carrier (CW wave) as low-going pulses of different lengths. For example the portion of the received signal designated by reference numeral 2422 may be a delimiter portion, indicating the beginning of a data portion.

Accordingly, the delimiter portion is followed by data portion 2424, which may include a number of low-going pulses, separated by the CW. Data portion 2424 conveys data rate information.

Data portion 2424 may be followed by another portion designated by reference numeral 2425. A length of the carrier in portion 2425 may provide information to the tag associated with a timing, such as timing of a calibration process.

Figure 25A:
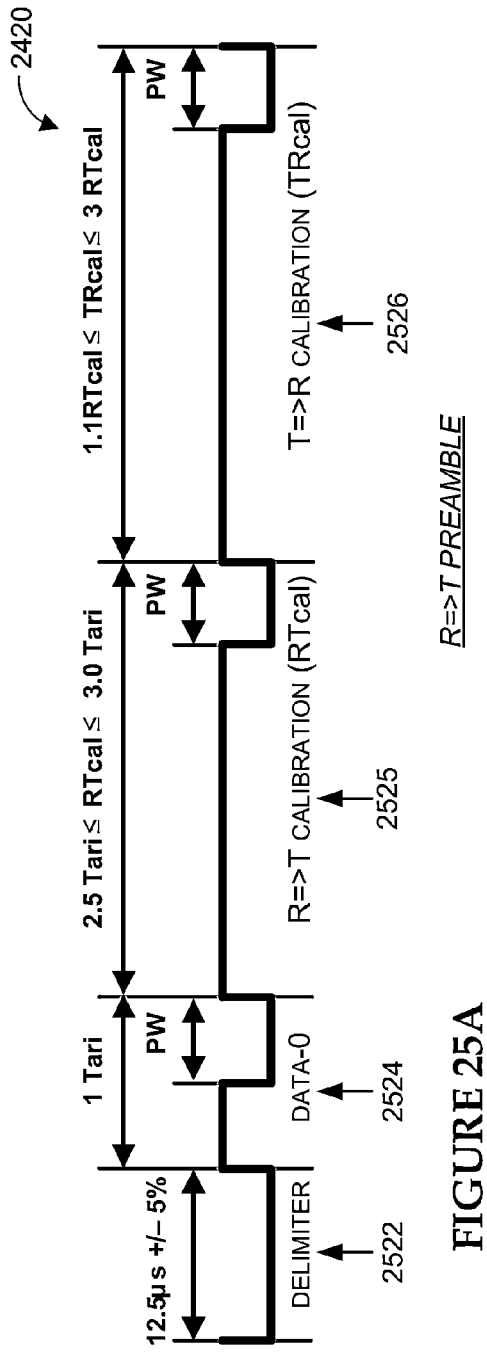
FIGS. 25A and 25B repeat the waveforms of FIG. 24, further showing detail according to which they convey timings to be used for subsequent communication, and which can be used to adjust the filter pass range as in FIG. 23B.
Figure 25B:
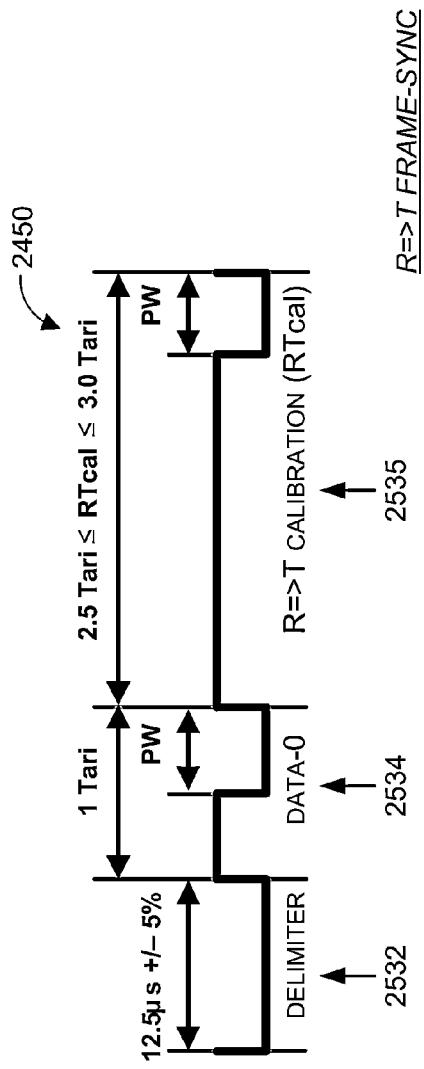

FIGS. 25A and 25B repeat the waveforms of FIG. 24, further showing detail according to which they convey information to be used for subsequent communication, and which can be used according to embodiments of the invention to adjust the filter pass range as in FIG. 23B.

Waveform 2420 may be a feature of a first wave 122, as received by tag 110-K. Waveform 2420 may be received by the tag during time interval 312, and especially during a calibration event. Ultimately waveform 2420 is received by a demodulator, such as demodulator 542 of FIG. 5, after the requisite processing.

Waveform 2420 includes some symbols that encode information. Each symbol may include a high portion followed by a terminating low pulse, denoted as PW. For purposes of illustration, all the PWs shown in FIG. 25A have the same duration; in actual practice, however, these lengths need not be the same.

In one embodiment, waveform 2420 begins with delimiter portion 2522, which may indicate to the tag the start of the calibration waveform. Delimiter portion 2522 is followed by a data portion 2524, which includes one or more data symbols. Only one such symbol is shown in the example of FIG. 25A, namely a "data-0".

Data portion 2524 is followed by one or more portions, whose duration conveys calibration information. Processing block 544 of FIG. 5 may use these durations to calibrate accordingly one or more tag functions.

One such RTcal portion 2525 conveys, by its own duration, a duration that is to be used for calibration for R→T sessions. Only one RTcal portion 2525 is shown in the example FIG. 25.

Another such TRcal portion 2526 follows RTcal 2525. In the shown embodiment, TRcal 2526 includes a high period of variable length, followed by a PW. TRcal portion 2526 conveys, by its own duration, a duration of a tag backscatter period that is to be used for determining the backscatter period that is to be used for the R→T sessions. As such, TRcal portion 2526 is part of the indirect instruction used for calibration.

Waveform 2420 is called preamble, and is typically used with Query commands. A shortened version of the preamble, called frame-sync, can be used with all commands is shown in FIG. 25B as waveform 2450. Waveform 2450 includes delimiter portion 2532, data portion 2534, and RTcal portion 2535, which are described above.

Figure 26:
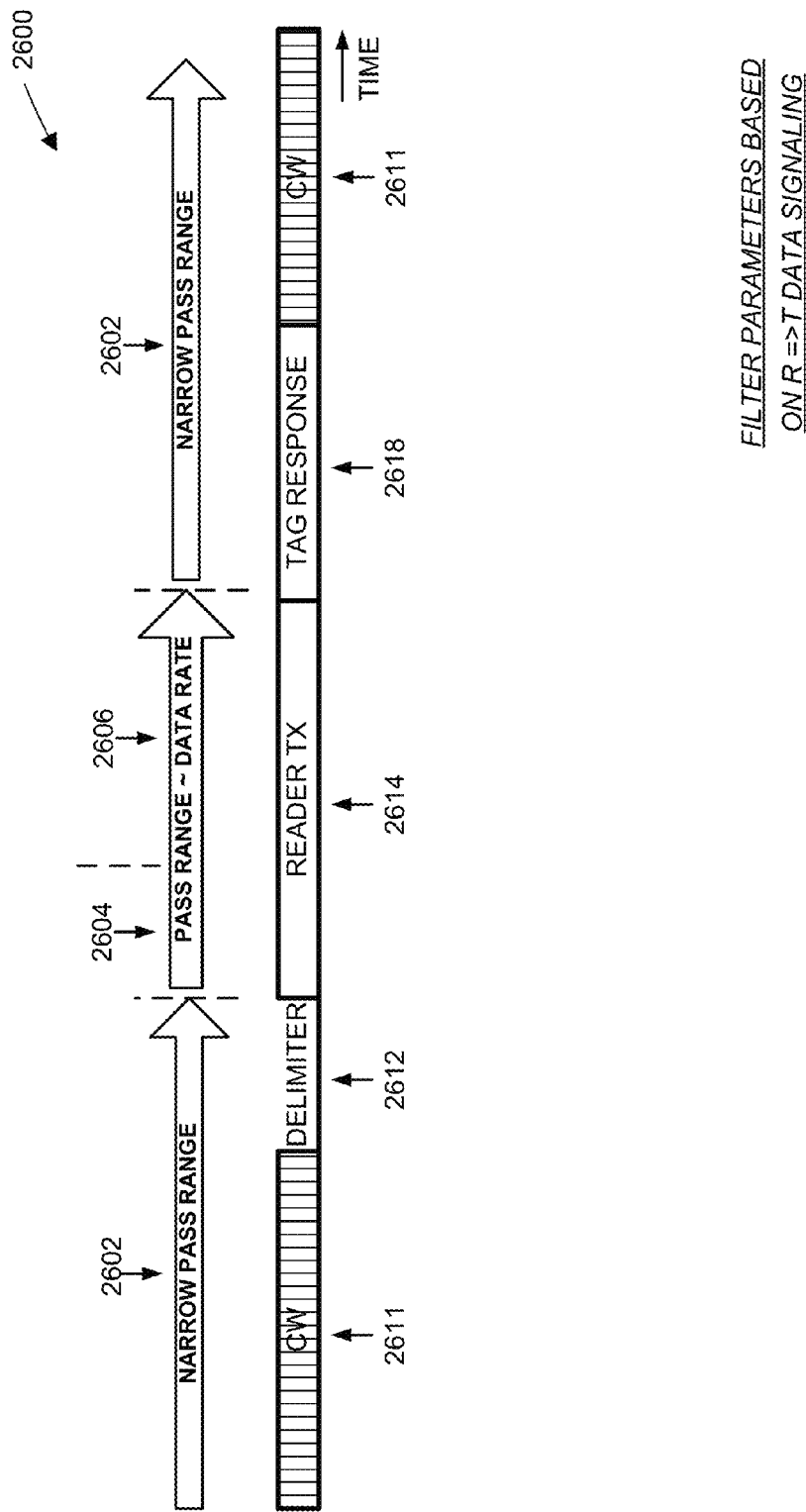
FIG. 26 is a diagram illustrating long term adjustment of a tag's interference-rejection filter parameter during generalized signaling between a reader and a tag.

FIG. 26 is a diagram illustrating long term adjustment of a tag's interference-rejection filter parameter, during generalized signaling between a reader and a tag.

Diagram 2600 shows the filter set to narrow pass range 2602 during CW portion 2611 and delimiter portion 2612 of the received signal at the tag. Following the delimiter portion, the filter is set to a wide pass range 2604 as determined based on the delimiter during the reader transmission part 2614.

In a second segment of the reader transmission part 2614, the pass range is set based on the data rate, as designated by reference numeral 2606.

When the tag begins its response to the reader 2618 after receiving the last symbol in a valid R→T command, the pass range may be reset to the more aggressive narrow setting again 2602, in anticipation of the next delimiter. Narrow pass range can still used during the CW portion 2611 following the tag's response to the reader.

Due to the characteristics of many interference sources, artifact feature can resemble bursts of low going pulses. As such, maximizing the time during which the filter pass range remains at its narrowest setting may improve system performance.

FIG. 27A is a diagram illustrating a sample waveform 2700A received during a portion of the signaling of FIG. 26, as distorted by a burst of interference, and as it is further swept by a filter of the tag in attempting to reject the artifacts due to the distortion while attempting to detect a preamble.

Delimiter 2712 precedes the preamble to be detected, and has a fixed low pulse width that is larger than the temporal width of most interference events. Therefore, in the search mode for valid delimiter 2752, the filter can be set to a pass range to reject any low-going pulses shorter than the expected valid delimiter, thereby vigorously rejecting interference events.

Thus, during the search mode, the filter sweeps with the preset low threshold time (event 2760) rejecting interference bursts 2711. As shown by event 2712, the delimiter is detected with the preset low threshold time.

FIG. 27B is a diagram illustrating how received waveform 2700A is reconstructed as a result of the filtering, to yield waveform 2700B. Delimited 2712 has been detected, but according to comment 2713, interference bursts 2711 have been rejected. This significantly reduces a risk of false preamble detection.

Figure 28:
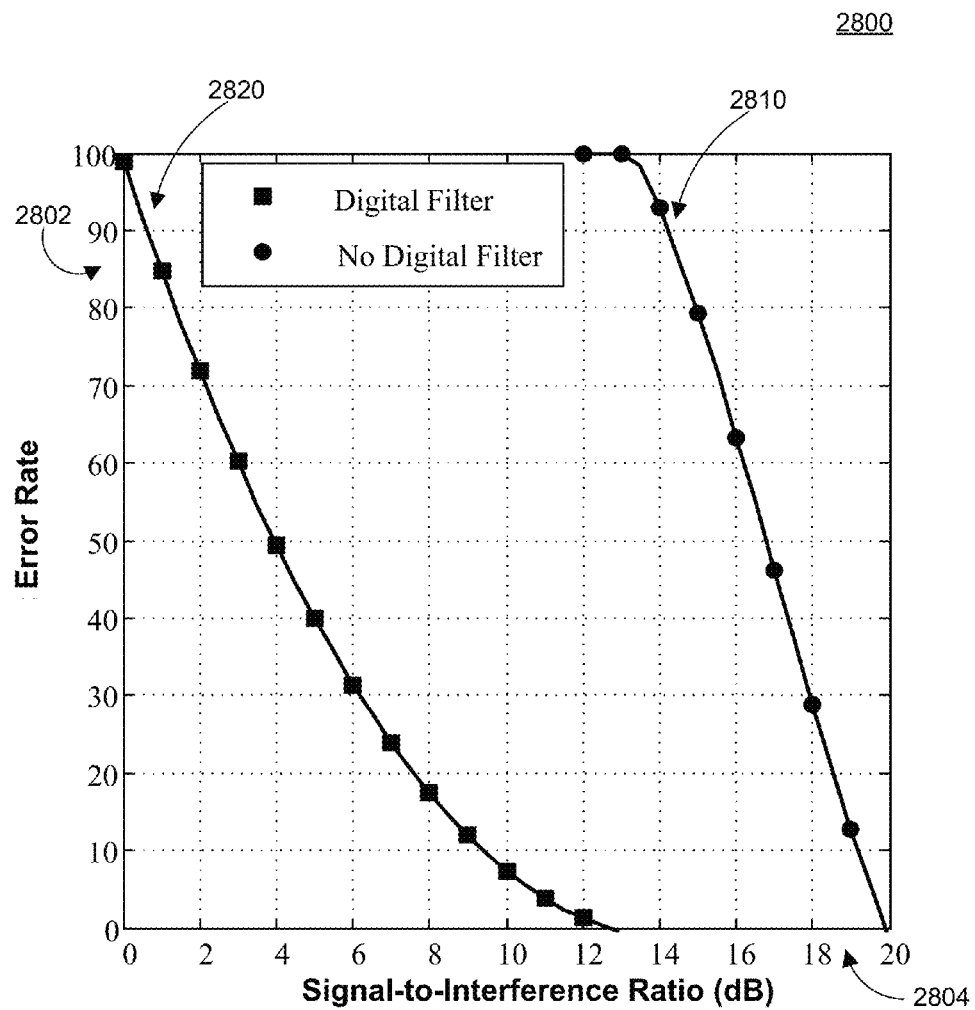
FIG. 28 is a diagram showing simulated results demonstrating an advantage of the invention embodiments.

FIG. 28 is a diagram showing simulated results demonstrating an advantage of embodiments. Diagram 2800 compares an Error Rate 2802 for two simulations against Signal-to-Interference Ratio 2804.

In the prior art simulation represented by plot 2810, a tag performance without digital filtering of the type of the present invention is shown. In an environment where there is little interference, the Signal-to-Interference Ratio 2804 will be high, e.g. 20 dB, and the Error Rate low (here 0, on an arbitrary scale). As interference increases, the Error Rate increases, and by the time Signal-to-Interference Ratio 2804 has reached about 13 dB, the Error Rate has increased to 100, at an arbitrary scale, which corresponds to poor performance.

Simulation 2820 is for where digital filtering is used, such as by IRF 968. The Error Rate is 0, which corresponds to high performance, even as interference has increased so much that the Signal-to-Interference Ratio 2804 has dropped to 13 dB. By that time, the Error Rate of prior art simulation 2810 had already reached 100.

Only where interference increases even more, does simulation 2820 reveal the onset of bit errors, even in the face of filtering. Regardless, that is a great improvement over the prior art.

A Radio Frequency Identification (RFID) tag circuit according to some embodiments includes a demodulator adapted to receive a modulated wireless RF input signal from an RFID reader and to derive a first digital output signal responsive to the modulated wireless RF input signal, where the first digital output signal comprises a sequence of digital pulses. The RFID tag circuit further includes an interference rejection circuit adapted to receive the first digital output and to derive a second digital output signal responsive to the first digital output by substantially removing digital pulses shorter than a first time duration threshold while substantially retaining digital pulses longer than the first time duration threshold.

According to other embodiments, the interference rejection circuit may also be adapted to receive the first digital output and to derive a second digital output signal responsive to the first digital output by substantially removing digital pulses shorter than a first time duration threshold and substantially removing digital pulses longer than a second time duration threshold while substantially retaining digital pulses that are longer than the first time duration threshold and shorter than the second time duration threshold. The digital pulses may be low going and/or high going pulses.

The first time duration threshold and the second time duration threshold may be derived from a clock signal or in response to the modulated wireless RF input signal or another modulated wireless RF input signal from the RFID reader. The first time duration threshold and the second time duration threshold may also be derived from a data rate or a feature duration associated with the modulated wireless RF input signal. The interference rejection circuit according to embodiments may be at least partially integrated into one of the demodulator and a processor block of the RFID circuit.

According to further embodiments, a method for an RFID tag may include receiving a modulated wireless RF input signal from an RFID reader at a demodulator of the RFID tag, deriving a first digital output signal responsive to the modulated wireless RF input signal where the first digital output signal comprises a sequence of digital pulses, and deriving a second digital output signal responsive to the first digital output at an interference rejection circuit of the RFID tag by substantially removing digital pulses shorter than a first time duration threshold while substantially retaining digital pulses longer than the first time duration threshold. The method may further include substantially removing digital pulses longer than a second time duration threshold while substantially retaining digital pulses that are shorter than the second time duration threshold.

In this description, numerous details have been set forth in order to provide a thorough understanding. In other instances, well-known features have not been described in detail in order to not obscure unnecessarily the description.

A person skilled in the art will be able to practice the present invention in view of this description, which is to be taken as a whole. The specific embodiments as disclosed and illustrated herein are not to be considered in a limiting sense. Indeed, it should be readily apparent to those skilled in the art that what is described herein may be modified in numerous ways. Such ways can include equivalents to what is described herein.

The following claims define certain combinations and sub-combinations of elements, features, steps, and/or functions, which are regarded as novel and non-obvious. Additional claims for other combinations and sub-combinations may be presented in this or a related document.

What is claimed is:

1. A Radio Frequency Identification (RFID) tag circuit comprising:
   a demodulator configured to:
      receive a modulated wireless RF input signal from an RFID reader, and derive a first digital output signal responsive to the modulated wireless RF input signal, wherein the first digital output signal comprises a sequence of digital pulses; and
   an interference rejection circuit configured to:
      receive the first digital output signal,
      determine a first time duration threshold,
      derive a second digital output signal responsive to the first digital output signal by substantially removing digital pulses shorter than the first time duration threshold while substantially retaining digital pulses longer than the first time duration threshold, and
      adjust the first time duration threshold based on at least one aspect associated with the wireless RF input signal selected from a preamble, a received packet, a filtered output signal, a data rate, and an expected next packet.

2. The tag circuit of claim 1, wherein the interference rejection circuit determines the first time duration threshold from at least one of a frame-sync tari symbol encoded in the modulated wireless RF input signal, a data rate associated with the modulated wireless RF input signal, and a statistic of a characteristic of a received data packet.

3. The tag circuit of claim 1, wherein the interference rejection circuit is further configured to derive the second digital output signal by substantially removing digital pulses longer than a second time duration threshold.

4. The tag circuit of claim 3, wherein the interference rejection circuit is further configured to adjust the second time duration threshold based on at least one of the preamble, the received packet, the filtered output signal, the data rate, and the expected next packet.

5. The tag circuit of claim 3, wherein the interference rejection circuit determines the second time duration threshold from at least one of a frame-sync tari symbol encoded in the modulated wireless RF input signal, a data rate associated with the modulated wireless RF input signal, and a statistic of a characteristic of a received data packet.

6. The tag circuit of claim 1, wherein the interference rejection circuit is further configured to:
   determine a third time duration threshold, and
   derive a third digital output signal responsive to the first digital output signal by substantially removing digital pulses shorter than the third time duration threshold while substantially retaining digital pulses longer than the third time duration threshold.

7. The tag circuit of claim 6, wherein the interference rejection circuit includes a multiplexer configured to select one of the first and third digital output signals.

8. A method for a Radio Frequency Identification (RFID) tag circuit, comprising:
   receiving a modulated wireless RF input signal from an RFID reader at a demodulator of the RFID tag;
   deriving a first digital output signal responsive to the modulated wireless RF input signal at the demodulator of the RFID tag, wherein the first digital output signal comprises a sequence of digital pulses; and
   deriving a second digital output signal responsive to the first digital output at an interference rejection circuit of the RFID tag by:
      receiving the first digital output signal,
      determining a first time duration threshold,
      deriving a second digital output signal responsive to the first digital output signal by substantially removing digital pulses shorter than the first time duration threshold while substantially retaining digital pulses longer than the first time duration threshold, and
      adjusting the first time duration threshold based on at least one aspect associated with the wireless RF input signal selected from at least one of a preamble, a received packet, a filtered output signal, a data rate, and an expected next packet.

9. The method of claim 8, further comprising determining the first time duration threshold from at least one of a frame-sync tari symbol encoded in the modulated wireless RF input signal, a data rate associated with the modulated wireless RF input signal, and a statistic of a characteristic of a received data packet.

10. The method of claim 8, further comprising deriving the second digital output signal by substantially removing digital pulses longer than a second time duration threshold.

11. The method of claim 10, further comprising adjusting the second time duration threshold based on at least one of the preamble, the received packet, the filtered output signal, the data rate, and the expected next packet.

12. The method of claim 10, further comprising determining the second time duration threshold from at least one of a frame-sync tari symbol encoded in the modulated wireless RF input signal, a data rate associated with the modulated wireless RF input signal, and a statistic of a characteristic of a received data packet.

13. The method of claim 8, further comprising:
determining a third time duration threshold, and
deriving a third digital output signal responsive to the first digital output signal by substantially removing digital pulses shorter than the third time duration threshold while substantially retaining digital pulses longer than the third time duration threshold.

14. The method of claim 13, further comprising selecting one of the first and third digital output signals.

15. A Radio Frequency Identification (RFID) tag circuit comprising:
a demodulator configured to:
receive a modulated wireless RF input signal from an RFID reader, and
derive a first digital output signal responsive to the modulated wireless RF input signal, wherein the first digital output signal comprises a sequence of digital pulses;
a counter configured to generate artifact numbers by counting time durations of the digital pulses; and
an interference rejection circuit configured to:
receive the first digital output signal,
determine a first low number corresponding to a first time duration threshold,
derive a second digital output signal responsive to the first digital output signal by substantially removing digital pulses with artifact numbers less than the first low number while substantially retaining digital pulses with artifact numbers greater than the first low number.

16. The tag circuit of claim 15, wherein the interference rejection circuit is further configured to adjust the low number based on at least one aspect associated with the wireless RF input signal selected from at least one of a preamble, a received packet, a filtered output signal, a data rate, and an expected next packet.

17. The tag circuit of claim 15, wherein the interference rejection circuit determines the time duration threshold from at least one of a frame-sync tari symbol encoded in the modulated wireless RF input signal, a data rate associated with the modulated wireless RF input signal, and a statistic of a characteristic of a received data packet.

18. The tag circuit of claim 15, wherein the counting is based on a clock signal of the tag circuit.

19. The tag circuit of claim 15, wherein the interference rejection circuit is further configured to derive the second digital output signal by substantially removing digital pulses with artifact numbers greater than a first high number.

20. The tag circuit of claim 15, wherein the interference rejection circuit is further configured to:
determine a second low number corresponding to a third time duration threshold, and
derive a third digital output signal responsive to the first digital output signal by substantially removing digital pulses with artifact numbers less than the second low number while substantially retaining digital pulses with artifact numbers greater than the second low number.

21. The tag circuit of claim 20, wherein the interference rejection circuit includes a multiplexer configured to select one of the first and third digital output signals.

* * * * *